US007653784B2

United States Patent
Nakagawa et al.

(10) Patent No.: US 7,653,784 B2
(45) Date of Patent: *Jan. 26, 2010

(54) MANAGEMENT COMPUTER, POWER SUPPLY CONTROL METHOD AND COMPUTER SYSTEM

(75) Inventors: Hirotaka Nakagawa, Tokyo (JP); Masayasu Asano, Tokyo (JP); Yuichi Taguchi, Tokyo (JP); Masayuki Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 393 days.

This patent is subject to a terminal disclaimer.

(21) Appl. No.: 11/638,902

(22) Filed: Dec. 13, 2006

(65) Prior Publication Data

US 2008/0104339 A1    May 1, 2008

(30) Foreign Application Priority Data

Oct. 30, 2006   (JP) ............................. 2006-294337

(51) Int. Cl.
*G06F 12/00* (2006.01)
(52) U.S. Cl. ...................................... 711/114; 713/324
(58) Field of Classification Search ........................ None
See application file for complete search history.

(56) References Cited

U.S. PATENT DOCUMENTS

| | | | |
|---|---|---|---|
| 6,697,952 B1 * | 2/2004 | King ........................... | 713/300 |
| 2003/0193732 A1 | 10/2003 | Hakamata et al. | |
| 2007/0250679 A1 * | 10/2007 | Umemura et al. ........... | 711/170 |
| 2008/0010234 A1 * | 1/2008 | Nakagawa et al. ............. | 707/1 |

FOREIGN PATENT DOCUMENTS

| | | |
|---|---|---|
| JP | 2000-293314 A | 10/2000 |
| JP | 2003-296153 A | 10/2003 |

\* cited by examiner

*Primary Examiner*—Hiep T Nguyen
(74) *Attorney, Agent, or Firm*—Sughrue Mion, PLLC

(57) ABSTRACT

This management computer for managing a plurality of storage apparatuses having a volume storing data sent from a host computer has a schedule information acquisition unit for acquiring schedule information as a schedule of a time frame in which the host computer accesses the volume of the plurality of storage apparatuses, and a power supply control command unit for sending to a corresponding storage apparatus a power supply control command for turning off a main power supply of the storage apparatus of a time frame in which the volume is not accessed based on a referral result of the schedule information acquired with the schedule acquisition unit.

19 Claims, 35 Drawing Sheets

FIG.7

| VOLUME ID (214A) | CAPACITY (214B) | ALLOCATION TARGET (214C) | CONTROLLER ID (214D) | NETWORK I/F ID (214E) | ARRAY GROUP ID (214F) |
|---|---|---|---|---|---|
| VOL001 | 100GB | H1 | Ctrl0 | Port0 | AG1 |
| VOL002 | 50GB | H2 | Ctrl0 | Port1 | AG1 |

| ARRAY GROUP ID (215A) | ARRAY GROUP LOGICAL STORAGE CAPACITY (215B) | RAID LEVEL (215C) | DISK ID (215D) | DISK PHYSICAL STORAGE CAPACITY (215E) |
|---|---|---|---|---|
| AG1 | 150GB | RAID5 3D+1P | Disk001 | 50GB |
| | | | Disk002 | 50GB |
| | | | Disk003 | 50GB |
| | | | Disk004 | 50GB |
| AG2 | 100GB | RAID5 2D+1P | Disk005 | 50GB |
| | | | Disk006 | 50GB |
| | | | Disk007 | 50GB |

| MEASUREMENT START TIME | MEASUREMENT END TIME | VOLUME ID | TRANSFER SPEED |
|---|---|---|---|
| 2006/07/01 0:00 | 2006/07/01 0:05 | VOL001 | 18MB/sec |
| 2006/07/01 0:00 | 2006/07/01 0:05 | VOL002 | 7MB/sec |

| STORAGE APPARATUS ID | TYPE | APPARATUS IDENTIFY INFORMATION | IP ADDRESS | ENERGY CONSUMPTION EFFICIENCY |
|---|---|---|---|---|
| ST1 | STORAGE | VENDER A, MODEL A, SERIAL NUMBER AD1 | 12.12.12.12 | 0.11W/GB |
| ST2 | STORAGE | VENDER B, MODEL A, SERIAL NUMBER BG2 | 12.12.13.10 | 0.14W/GB |
| ST3 | STORAGE | VENDER C, MODEL C, SERIAL NUMBER 451 | 12.12.15.145 | 0.22W/GB |

| STORAGE APPARATUS ID (520A) | NETWORK I/F ID (520B) | MAXIMUM TRANSFER SPEED (520C) | THRESHOLD VALUE (520D) |
|---|---|---|---|
| ST1 | Port0 | 100 MB/sec | 80 MB/sec |
| ST1 | Port1 | 100 MB/sec | 80 MB/sec |
| ST2 | Port0 | 100 MB/sec | 80 MB/sec |
| ST3 | Port0 | 100 MB/sec | 70 MB/sec |
| ST3 | Port1 | 100 MB/sec | 70 MB/sec |

| GLOBAL VOLUME ID (521A) | ALLOCATION TARGET (521B) | STORAGE APPARATUS ID (521C) | APPARATUS INTERNAL VOLUME ID (521D) | ALLOCATION CAPACITY (521E) |
|---|---|---|---|---|
| GVOL0001 | H1 | ST1 | VOL001 | 100GB |
| GVOL0002 | H2 | ST1 | VOL002 | 50GB |
| GVOL0003 | H1 | ST2 | VOL001 | 100GB |
| GVOL0004 | H1 | ST3 | VOL001 | 5GB |

| GLOBAL VOLUME ID | OPERATION SCHEDULE | | REQUESTED TRANSFER SPEED |
|---|---|---|---|
| | DAY | TIME | |
| GVOL0001 | MON, TUE, WED, THU, FRI | 7:00~20:00 | 30MB/sec |
| GVOL0002 | EVERY DAY | 10:00~22:00 | 40MB/sec |
| GVOL0003 | MON, TUE, WED, THU, FRI | 23:00~29:00 | 30MB/sec |

| START TIME | COMPLETION TIME | GLOBAL VOLUME ID | MIGRATION SOURCE STORAGE APPARATUS ID | MIGRATION SOURCE VOLUME ID | MIGRATION TARGET STORAGE APPARATUS ID | MIGRATION TARGET VOLUME ID |
|---|---|---|---|---|---|---|
| 2006/06/30 01:30.30 | 2006/06/30 04:43.35 | GVOL0001 | ST2 | VOL003 | ST1 | VOL001 |
| 2006/06/29 23:00.00 | 2006/06/29 1:34.32 | GVOL0006 | ST1 | VOL003 | ST3 | VOL001 |
| ... | ... | ... | ... | ... | ... | ... |

VOLUME OPERATION SCHEDULE INPUT SCREEN

GLOBAL VOLUME ID | GVOL0001 ~811

812

[MB/sec]

ACCESS LOAD STATUS

30

SUN  MON  TUE  WED  THU  FRI  SAT  [h]

| VOLUME | ALLOCATION TARGET |
|---|---|
| 100GB | H1 |

○ EVERY DAY ~813

◉ DESIGNATE DAY(S)
☐ SUN ☑ MON ☑ TUE ☑ WED ☑ THU ☑ FRI ☐ SAT

TIME FRAME : FROM [7] TO [20]

REQUESTED DATA TRANSFER SPEED : [30] MB/sec

[REGISTER] [CANCEL]

FIG.21

VOLUME OPERATION SCHEDULE RELEASE SCREEN

| GLOBAL VOLUME ID | GVOL0001 | ~821 |

822

| DAY | TIME FRAME | TRANSFER SPEED | |
|---|---|---|---|
| MON,TUE,WED,THU,FRI, | 7:00~20:00 | 30MB/sec | |
| | | | |
| SAT | 12:00~17:00 | 20MB/sec | |

823  824

[RELEASE] [CLOSE]

| 823A | 823B | 823C | 823D | 823E | 823F | 823 |
|---|---|---|---|---|---|---|

| VIRTUAL VOLUME ID | CAPACITY | ALLOCATION TARGET | CONTROLLER ID | EXTERNAL CONNECTION PORT ID | REAL STORAGE INFORMATION | |
| | | | | | STORAGE APPARATUS ID | APPARATUS INTERNAL VOLUME ID |
| V1-VOL1 | 50GB | H1 | Ctrl0 | ExtPort0 | ST1 | VOL001 |
| V1-VOL2 | 150GB | H1 | Ctrl0 | ExtPort0 | ST1 | VOL002 |

| COMPONENT ID | POWER SUPPLY STATUS |
|---|---|
| Port0 | ON |
| Port1 | ON |
| CONTROLLER 0 | ON |
| ExtPort0 | ON |
| ExtPort1 | ON |
| MAIN POWER SUPPLY | ON |
| STANDBY POWER SUPPLY | ON |

825A — COMPONENT ID
825B — POWER SUPPLY STATUS
825

FIG.31

901A — STORAGE CONTROLLER ID
901B — VIRTUAL VOLUME ID
901C — REAL STORAGE INFORMATION
901D — STORAGE APPARATUS ID
901E — APPARATUS INTERNAL VOLUME ID
901

| STORAGE CONTROLLER ID | VIRTUAL VOLUME ID | REAL STORAGE INFORMATION | |
|---|---|---|---|
| | | STORAGE APPARATUS ID | APPARATUS INTERNAL VOLUME ID |
| SC1 | V1-VOL1 | ST1 | VOL001 |
| SC1 | V1-VOL2 | ST1 | VOL002 |
| SC1 | V1-VOL3 | ST2 | VOL001 |
| SC1 | V1-VOL4 | ST3 | VOL001 |

FIG.37

| STORAGE APPARATUS ID (519A) | INTERNAL DEVICE ID (519B) | VOLUME CAPACITY (519C) | CONTROLLER ID (519D) | NETWORK I/F ID (519E) | ARRAY GROUP ID (519F) |
|---|---|---|---|---|---|
| ST1 | VOL001 | 10GB | Ctrl0 | Port0 | AG1 |
| ST1 | VOL002 | 5GB | Ctrl0 | Port1 | AG1 |
| ST1 | UNUSED STORAGE EXTENT | 35GB | - | - | AG2 |
| ST2 | VOL001 | 10GB | Ctrl0 | Port0 | AG1 |
| ST2 | UNUSED STORAGE EXTENT | 40GB | - | - | AG2 |
| ST3 | VOL001 | 5GB | Ctrl0 | Port0 | AG1 |
| ST3 | UNUSED STORAGE EXTENT | 50GB | - | - | AG2 |

FIG.38

| GLOBAL VOLUME ID (904A) | ALLOCATION TARGET (904B) | STORAGE CONTROLLER ID (904C) | INTERNAL CONTROLLER VIRTUAL VOLUME ID (904D) | ALLOCATION CAPACITY (904E) |
|---|---|---|---|---|
| GVOL0001 | H1 | SC1 | V1-VOL1 | 10GB |
| GVOL0002 | H2 | SC1 | V1-VOL2 | 5GB |
| GVOL0003 | H1 | SC1 | V1-VOL3 | 10GB |
| GVOL0004 | H1 | SC1 | V1-VOL4 | 5GB |

FIG.40

| STORAGE APPARATUS ID | NETWORK IF/ID | THRESHOLD VALUE | ACCESS LOAD | AFFILIATED VOLUME |
|---|---|---|---|---|
| ST1 | Port0 | 80MB/sec | 55MB/sec | GVOL0001 |
|  | Port1 | 80MB/sec | 48MB/sec | GVOL0002 |
| ST2 | Port0 | 80MB/sec | 38MB/sec | GVOL0003 |
| ST3 | Port0 | 70MB/sec | 44MB/sec | GVOL0004 |
|  | Port1 | 70MB/sec | 0MB/sec | - |

FIG.41

| STORAGE APPARATUS ID | NETWORK IF/ID | THRESHOLD VALUE | ACCESS LOAD | AFFILIATED VOLUME |
|---|---|---|---|---|
| ST1 | Port0 | 80MB/sec | 67MB/sec | GVOL0001 |
|  |  |  |  | GVOL0003 |
|  | Port1 | 80MB/sec | 48MB/sec | GVOL0002 |
| ST2 | Port0 | 80MB/sec | 44MB/sec | GVOL0004 |
| ST3 | Port0 | 70MB/sec | 0MB/sec | - |
|  | Port1 | 70MB/sec | 0MB/sec | - |

FIG.42

| STORAGE APPARATUS ID | NETWORK IF/ID | THRESHOLD VALUE | ACCESS LOAD | AFFILIATED VOLUME |
|---|---|---|---|---|
| ST1 | Port0 | 80MB/sec | 67MB/sec | GVOL0001 |
|  |  |  |  | GVOL0003 |
|  | Port1 | 80MB/sec | 68MB/sec | GVOL0002 |
|  |  |  |  | GVOL0004 |
| ST2 | Port0 | 80MB/sec | 0MB/sec | - |
| ST3 | Port0 | 70MB/sec | 0MB/sec | - |
|  | Port1 | 70MB/sec | 0MB/sec | - |

FIG.43

| STORAGE APPARATUS ID | NETWORK IF/ID | THRESHOLD VALUE | ACCESS LOAD | AFFILIATED VOLUME |
|---|---|---|---|---|
| ST1 | Port0 | 80MB/sec | 55MB/sec | GVOL0001 |
|  | Port1 | 80MB/sec | 68MB/sec | GVOL0002 |
|  |  |  |  | GVOL0004 |
| ST2 | Port0 | 80MB/sec | 38MB/sec | GVOL0003 |
| ST3 | Port0 | 70MB/sec | 0MB/sec | - |
|  | Port1 | 70MB/sec | 0MB/sec | - |

MANAGEMENT COMPUTER, POWER SUPPLY CONTROL METHOD AND COMPUTER SYSTEM

CROSS REFERENCES

This application relates to and claims priority from Japanese Patent Application No. 2006-294337, filed on Oct. 30, 2006, the entire disclosure of which is incorporated herein by reference.

BACKGROUND

The present invention generally relates to a management computer, a power supply control method and a computer system, and, for instance, can be suitably applied to a computer system that performs power supply control of a plurality of storage apparatuses.

In recent years, data handled by corporations and individuals is becoming diversified and, together with the mandatory long-term storage of electronic data, the data volume to be stored in storage apparatuses is increasing rapidly. Thus, in order to realize flexible scalability and reduction in management costs based on uniform management, a computer system is adopting a storage network configuration (primarily known as SAN (Storage Area Network) which connects a plurality of servers and a plurality of storage apparatuses with the likes of a switch or a hub. A computer system is constantly demanded of higher sophistication and lower prices. Recently, environmental issues are becoming an increased center of focus, and energy conservation is also being demanded.

In order to conserve energy in a computer system, with respect to a stand-alone memory apparatus (hereinafter also referred to as a storage apparatus), disclosed is technology of monitoring the volume access frequency from a host computer using a storage extent (hereinafter also referred to as a volume) of the storage apparatus, and changing a disk device configuring the volume to an energy conservation mode when the volume is not accessed for a prescribed period of time, or turning off the power supply (energy conservation processing), and technology of executing diagnosis to maintain the reliability of the disk device subject to the energy conservation processing after the lapse of a prescribed period of time from the start of energy conservation processing, or when it becomes a designated time (for instance, refer to Japanese Patent Laid-Open Publication No. 2000-293314).

Further, with respect to a storage system having a plurality of storage processors for processing data access requests from a host computer in a storage apparatus, disclosed is technology of balancing/integrating the access load in different storage processors according to the access load fluctuation (IOPS (Input/Output per second) fluctuation) of the storage processor so as to improve the response to the data access from the user, and migrating storage processors not subject to a load to a sleep mode so as to improve the power efficiency (for instance, refer to Japanese Patent Laid-Open Publication No. 2003-296153).

The power supply control technology of disk devices in a storage apparatus disclosed in Japanese Patent Laid-Open Publication No. 2000-293314 describes the performance of power supply control of disk devices in the storage apparatus according to the volume access frequency of the host computer using the volume. Further, the power supply control of a storage processor in the storage system disclosed in Japanese Patent Laid-Open Publication No. 2003-296153 describes the performance of power supply control of the storage processor in the storage system according to the access frequency of data in the computer using such data stored in the storage system.

Nevertheless, with the foregoing power supply control technologies according to the data access frequency, since power supply control is also performed to the accidental increase or decrease in the access frequency, it is necessary to repeat the turn-on and turn-off of the power supply in short intervals, and there is a problem in that the power consumption will increase in apparatuses in which the incoming current when the power supply is turned on is greater than the ordinary current.

Further, components and the main power supply (power supply of the case) other than the disk devices and storage processors are constantly in operation, and consume extra power. Therefore, with a computer system including a plurality of storage apparatuses, extra power to operate components and the main power supply other than the disk devices is required, and there is a problem in that extra power consumption will increase in proportion to the number of storage apparatuses.

SUMMARY

The present invention was made in view of the foregoing conventional problems. Thus, an object of this invention is to propose a management computer, a power supply control method and a computer system capable of reducing power consumption while maintaining access performance.

In order to achieve the foregoing object, one aspect of the present invention provides a management computer for managing a plurality of storage apparatuses having a volume storing data sent from a host computer. This management computer has a schedule information acquisition unit for acquiring schedule information as a schedule of a time frame in which the host computer accesses the volume of the plurality of storage apparatuses, and a power supply control command unit for sending to a corresponding storage apparatus a power supply control command for turning off a main power supply of the storage apparatus of a time frame in which the volume is not accessed based on a referral result of the schedule information acquired with the schedule acquisition unit.

Further, another aspect of the present invention provides a power supply control method of a management computer for managing a plurality of storage apparatuses having a volume storing data sent from a host computer. This power supply control method has a first step of acquiring schedule information as a schedule of a time frame in which the host computer accesses the volume of the plurality of storage apparatuses, and a second step of sending to a corresponding storage apparatus a power supply control command for turning off a main power supply of the storage apparatus of a time frame in which the volume is not accessed based on a referral result of the schedule information acquired at the acquisition step.

Moreover, another aspect of the present invention provides a computer system including a plurality of storage apparatuses having a volume storing data sent from a host computer, and a management computer for managing the plurality of storage apparatuses. In this computer system, the management computer has a schedule information acquisition unit for acquiring schedule information as a schedule of a time frame in which the host computer accesses the volume of the plurality of storage apparatuses, and a power supply control command unit for sending to a corresponding storage apparatus a power supply control command for turning off a main power supply of the storage apparatus of a time frame in which the volume is not accessed based on a referral result of the schedule information acquired with the schedule acquisition unit. In addition, the plurality of storage apparatuses comprise a power supply control unit for turning off the main power supply based on the power supply control command sent from the power supply control command unit.

Accordingly, since it is possible to effectively and validly prevent power consumption in cases of repeatedly turning on and turning off the power supply in short intervals due to the accidental increase or decrease in the access frequency, and extra power consumption required to operate components and the main power supply other than the components required in accessing the volume, it is possible to reduce the power consumption arising from accessing the volume, and reduce the power consumption of the overall computer system.

According to the present invention, it is possible to realize a management computer, a power supply control method and a computer system capable of reducing power consumption while maintaining access performance.

DESCRIPTION OF DRAWINGS

FIG. 7 is a conceptual diagram explaining a volume management table;

FIG. 8 is a conceptual diagram explaining a disk configuration management table;

FIG. 11 is a conceptual diagram explaining access load management information;

FIG. 12 is a conceptual diagram explaining a storage apparatus management table;

FIG. 14 is a conceptual diagram explaining network I/F management information;

FIG. 15 is a conceptual diagram explaining volume allocation management information;

FIG. 16 is a conceptual diagram explaining volume operation schedule management information;

FIG. 17 is a conceptual diagram explaining volume migration management information;

FIG. 20 is a conceptual diagram explaining a volume operation schedule input screen;

FIG. 21 is a conceptual diagram explaining volume operation schedule release screen;

FIG. 29 is a conceptual diagram explaining a virtual volume management table;

FIG. 30 is a conceptual diagram explaining a power supply management table;

FIG. 31 is a conceptual diagram explaining virtual volume management information;

FIG. 37 is a conceptual diagram explaining the execution process of power supply control command processing according to another embodiment of the present invention;

FIG. 38 is a conceptual diagram explaining the execution process of power supply control command processing according to another embodiment of the present invention;

FIG. 40 is a conceptual diagram explaining the execution process of power supply control command processing according to another embodiment of the present invention;

FIG. 41 is a conceptual diagram explaining the execution process of power supply control command processing according to another embodiment of the present invention;

FIG. 42 is a conceptual diagram explaining the execution process of power supply control command processing according to another embodiment of the present invention;

FIG. 43 is a conceptual diagram explaining the execution process of power supply control command processing according to another embodiment of the present invention.

DETAILED DESCRIPTION

Embodiments of the present invention are now explained in detail with reference to the attached drawings. Incidentally, the present invention shall not be limited in any way by the following explanation.

(1) First Embodiment

(1-1) Configuration of Computer System 1 in First Embodiment

FIG. 1 to FIG. 6 show the overall configuration of a computer system 1 and the configuration of the respective apparatuses in the computer system 1.

Figure 1:
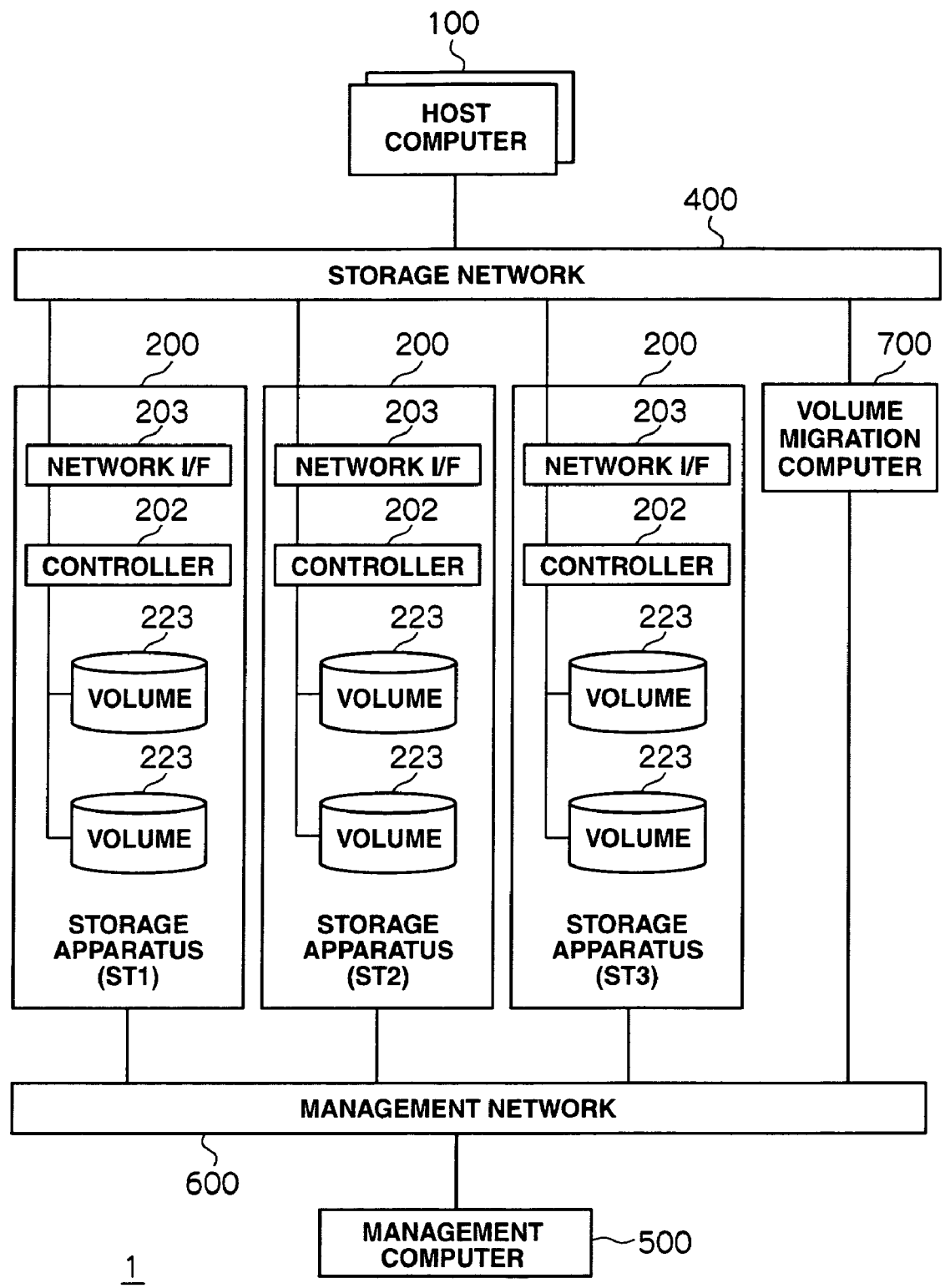
FIG. 1 is a block diagram showing a schematic configuration of a computer system according an embodiment of the present invention.

FIG. 1 shows the overall configuration of the computer system 1. One or more host computers 100 and one or more storage apparatuses 200 using one or more volumes 223 are connected via a storage network 400. The storage apparatuses 200 and a management computer 500 managing the storage apparatuses 200 are connected via a management network 600. The storage apparatuses 200 and a volume migration computer 700 are connected via the storage network 400, and the volume migration computer 700 receives a data migration request from the management computer 500. The management computer 500 and the volume migration computer 700 are connected via the management network 600, and the volume migration computer 700 receives a data migration request from the management computer 500.

For the convenience of ensuing explanations, in the first embodiment, let it be assumed that the host computer 100 is connected to the storage apparatuses 200 having storage apparatus IDs of "ST1", "ST2", "ST3" (described later) via the storage network 400. Further, let it be assumed that the storage network 400 is a network using a fibre channel protocol, and the management network 600 is a network using an IP (Internet Protocol) protocol. Incidentally, the storage administrator uses the management computer 500 to manage the storage apparatuses 200 and the volume migration computer 700, and the host administrator uses the host computer 100 to manage the business operations using the volumes 223.

(1-1-1) Configuration of Host Computer 100

Figure 2:
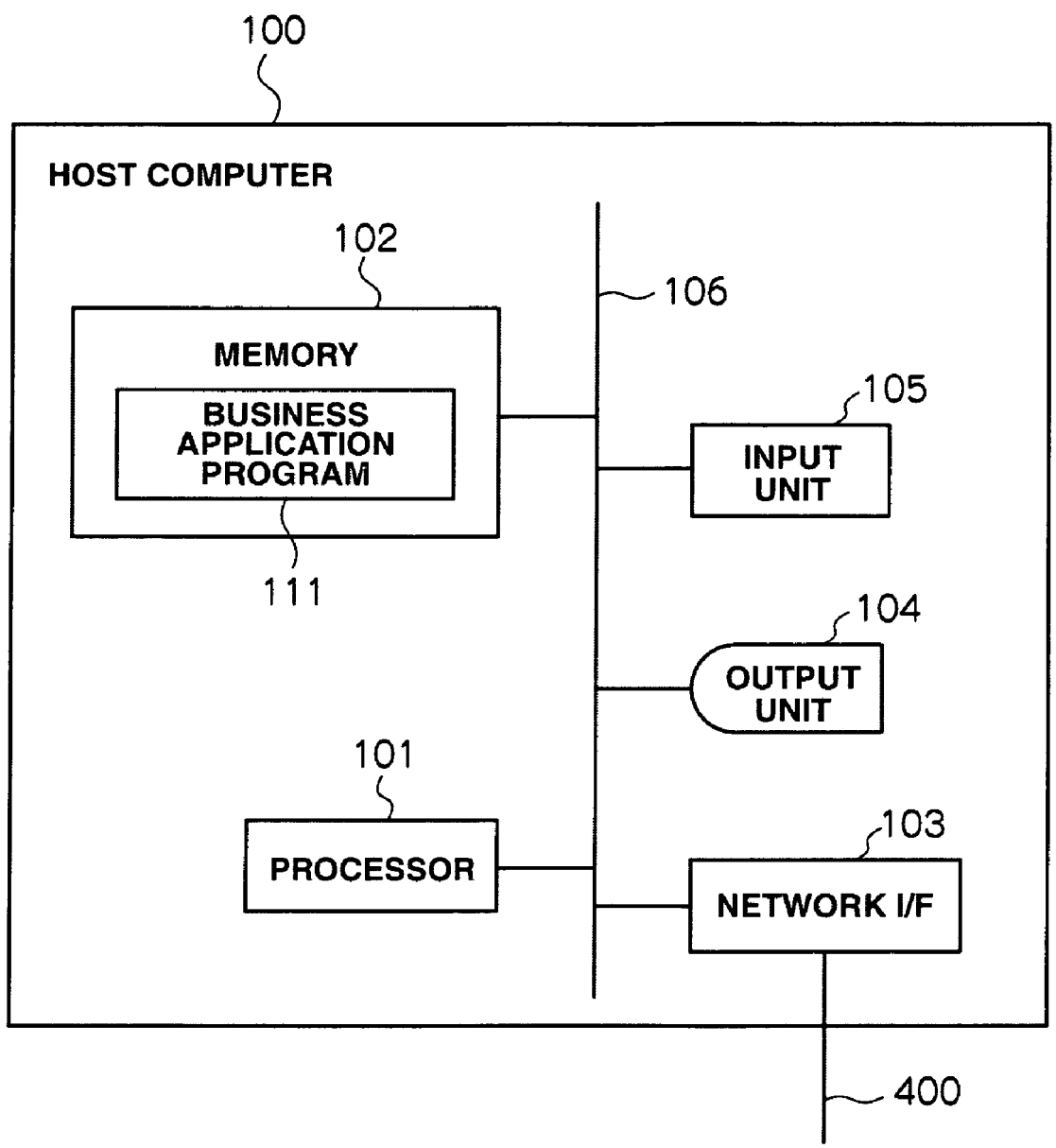
FIG. 2 is a block diagram showing a schematic configuration of a host computer.

FIG. 2 shows an example of a detailed configuration of the host computer 100. The host computer 100 comprises a processor 101, a memory 102, one or more network interfaces (hereinafter referred to as a network I/F (Interface)) 103 for connecting to the storage network 400, an output unit 104 such as a display device for outputting the processing result, and an input unit 105 such as a keyboard or a mouse, and these components are mutually connected via an internal bus 106.

The memory 102 is loaded with an operating system (OS) (not shown), and one or more business application programs 111 for performing processing involving data access to the volumes 223 from a storage medium (not shown) such as a hard disk. As a result of executing these programs, the processor 101 is able to read and write data stored in the volumes 223.

(1-1-2) Configuration of Volume Migration Computer 700

Figure 3:
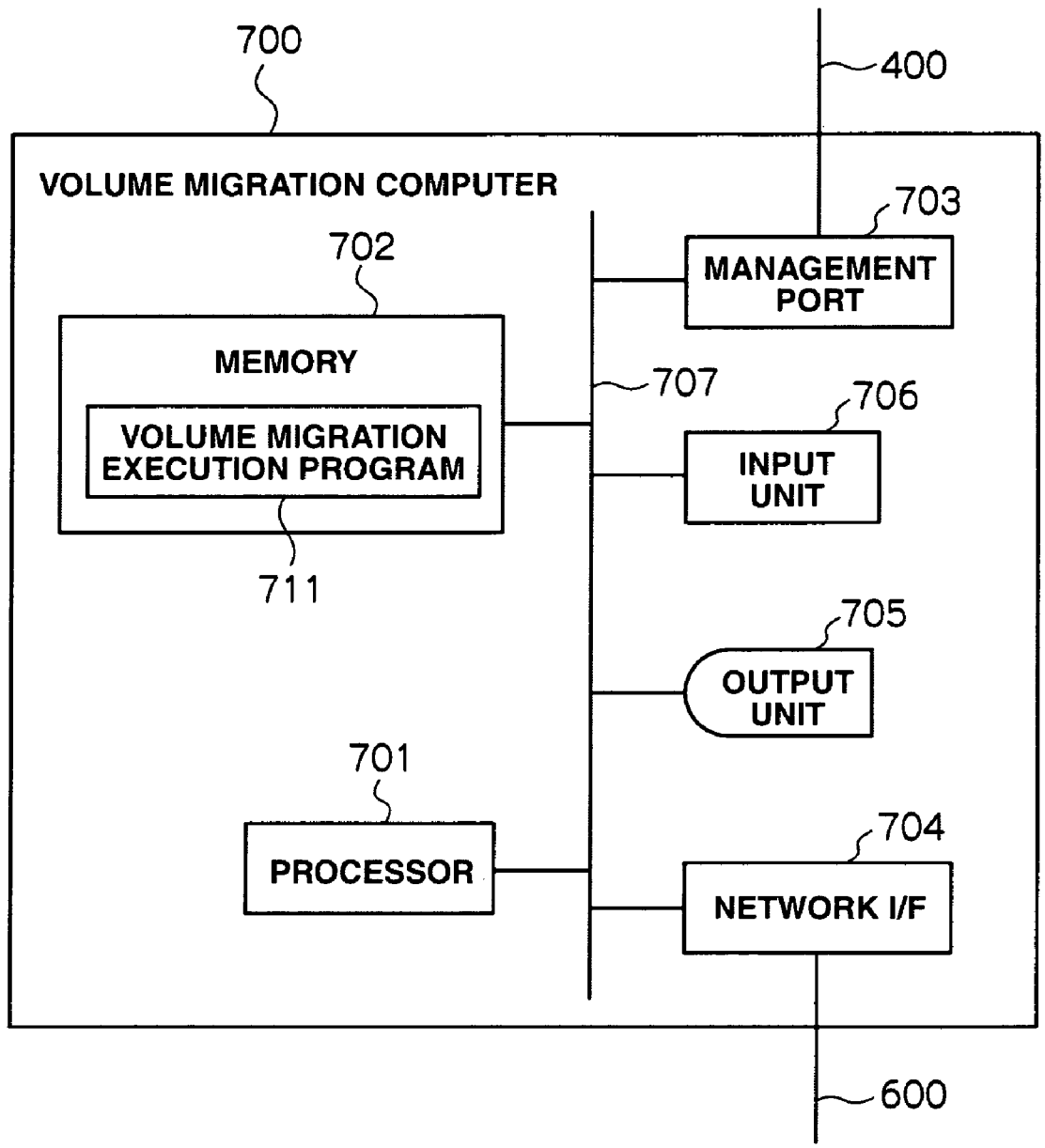
FIG. 3 is a block diagram showing a schematic configuration of a volume migration computer.

FIG. 3 shows an example of a detailed configuration of the volume migration computer 700. The volume migration computer 700 comprises a processor 701, a memory 702, one or more network I/Fs 703 for connecting to the storage network 400, one or more management port 704 for connecting to the management network 600, an output unit 705 such as a display device for outputting the processing result, and an input unit 706 such as a keyboard or a mouse, and these components are mutually connected via an internal bus 707.

The memory 702 is loaded with an operating system (not shown), and a volume migration execution program 711 for migrating the volumes 223 between the storage apparatuses 200 (migrating data in the volumes 223) from a storage medium (not shown) such as a hard disk. As a result of executing these programs, the processor 701 is able to migrate data of the volumes 223.

(1-1-3) Configuration of Storage Apparatus 200

Figure 4:
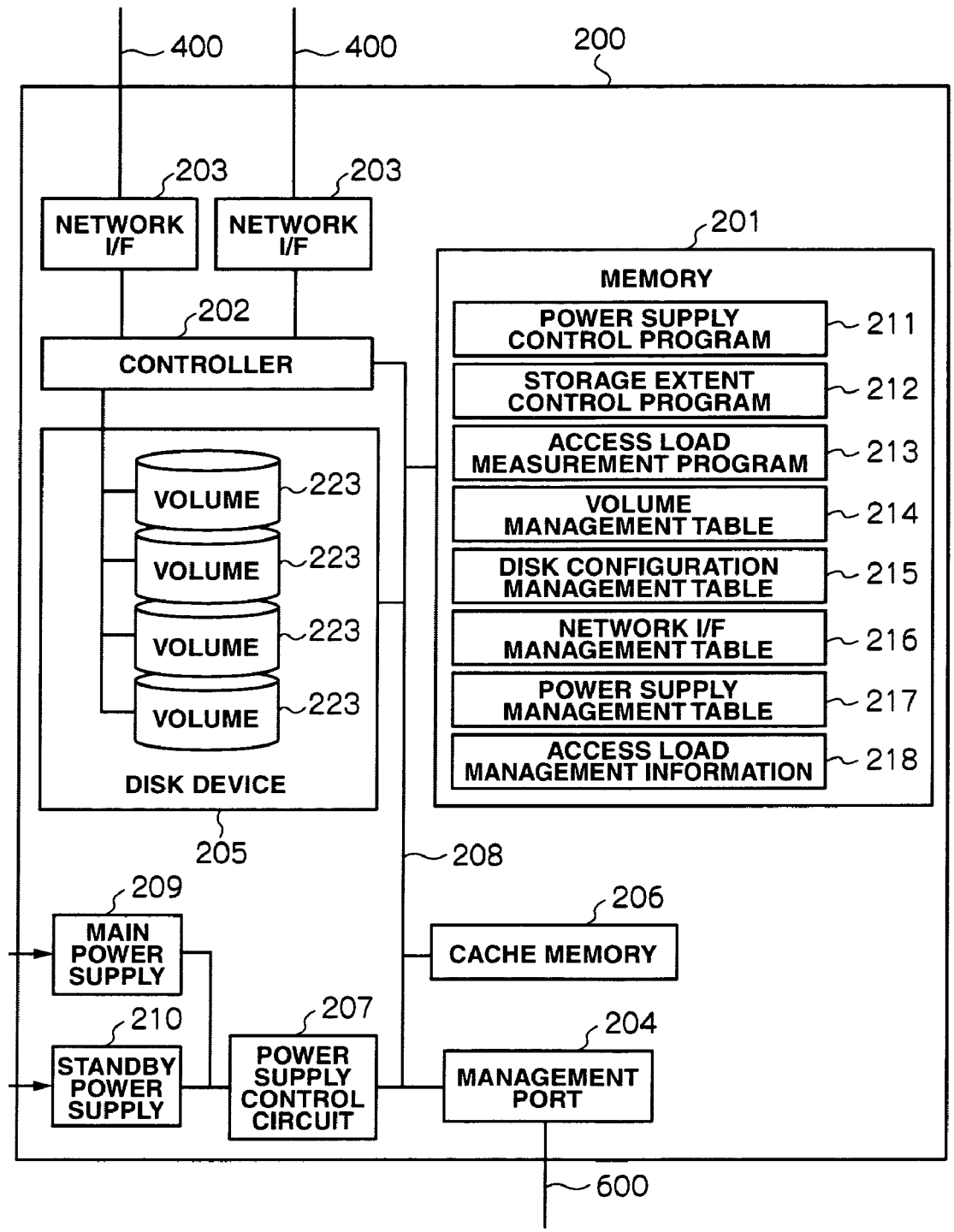
FIG. 4 is a block diagram showing a schematic configuration of a storage apparatus.

FIG. 4 shows an example of a detailed configuration of the storage apparatus 200. The storage apparatus 200 comprises the following components (constituent elements). In other words, the storage apparatus 200 comprises a memory 201 for retaining programs, tables and management information stored in the storage apparatus 200, a controller 202 for controlling the components in the storage apparatus 200 by executing the programs in the memory 201, one or more network I/Fs 203 for connecting to the storage network 400, a management port 204 for connecting to the management network 600, a disk device 205 having a storage medium such as a hard disk, a cache memory 206 for temporarily retaining the data sent to and received from the host computer 100, and a power supply control circuit 207 for controlling the power supply to components in the storage apparatus 200, and these components are mutually connected via an internal path 208.

The storage apparatus 200 further comprises a main power supply 209 for incorporating external power supply, and a standby power supply 210 for supplying minimum power to the controller 202 and the memory 201 when the main power supply 209 is turned off. The switching of the main power supply 209 and the standby power supply 210, and the power supply to the respective components in the storage apparatus 200 are controlled by the power supply control circuit 207 executing the power supply control request sent from the controller 202.

The memory 201 stores a power supply control program 211 for processing a power supply control request in the storage apparatus sent from the management computer 500, a storage extent control program 212 for executing the creation/deletion request of a storage extent (logical storage extent and physical storage extent) in the storage apparatus 200 and the allocation request to the host computer 100 of the logical storage extent issued from the management computer 500, an access load measurement program 213 for executing an access load measurement request of the volume 223 in the storage apparatus 200 issued from the management computer 500, a volume management table 214 for managing the configuration of the volumes 223 and allocation to the host computer, a disk configuration management table 215 for managing the configuration of disks in the disk device 205, a network I/F management table 216 for managing the configuration of the network I/F 203 in the storage apparatus 200, a power supply management table 217 for retaining the power supply status of components in the storage apparatus 200, and an access load management information 218 for retaining the measurement results obtained with the access load measurement program 213. These programs, tables and management information are loaded from a storage medium (not shown) such as a hard disk upon booting the storage apparatus 200. The controller 202 performs various processes by executing these programs and referring to these tables and management information.

Figure 5:
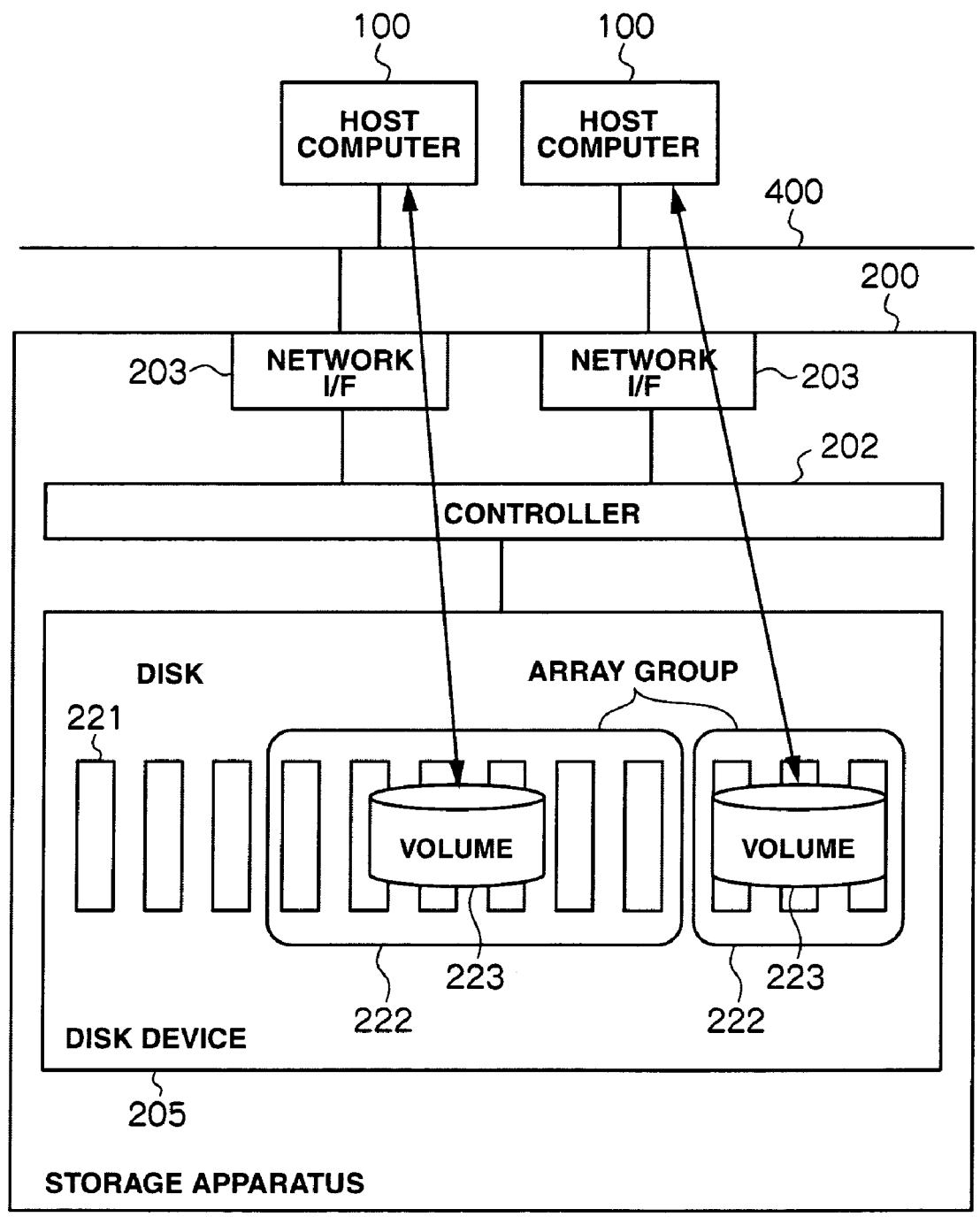
FIG. 5 is a block diagram showing a schematic configuration of a storage extent of a storage apparatus.

FIG. 5 shows a configuration of the volume 23 provided by the storage apparatus 200 to the host computer 100. The disk device 205 of the storage apparatus 200 is equipped with an array group 222 configured from one or more disks 221 (RAID configuration). The volume 223 is set as a logical storage extent on the array group 222.

(1-1-4) Configuration of Management Computer 500

Figure 6:
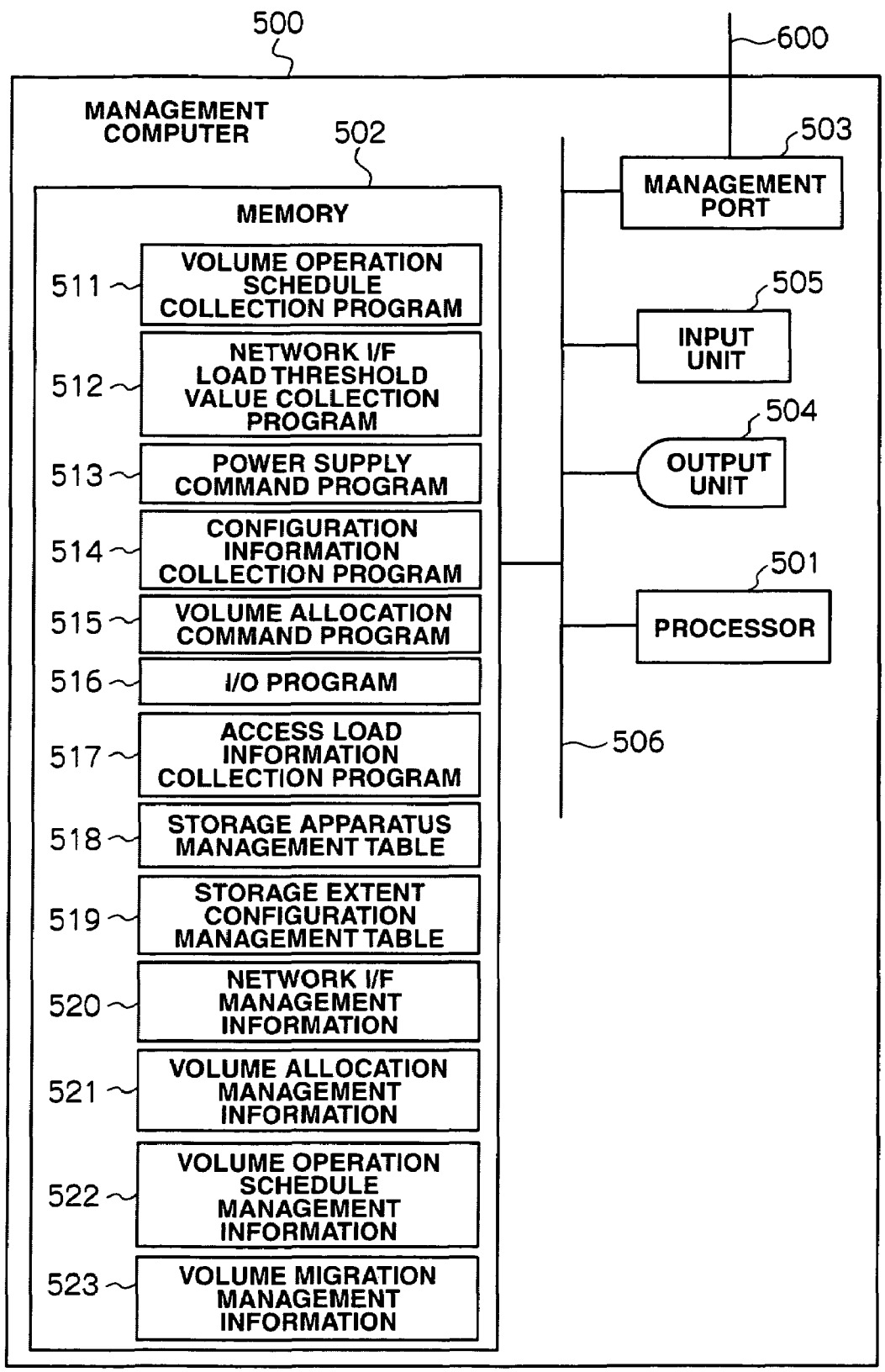
FIG. 6 is a block diagram showing a schematic configuration of a management computer according to an embodiment of the present invention.

FIG. 6 shows an example of a detailed configuration of the management computer 500. The management computer 500 comprises a processor 501, a memory 502, a management port 503 for connecting to the management network 600, an output unit 504 such as a display device for outputting the processing result, and an input unit 505 such as a keyboard or a mouse, and these components are mutually connected via an internal bus 506.

The memory 502 stores a volume operation schedule collection program 511, a network I/F load threshold value collection program 512, a power supply control command program 513, a configuration information collection program 514, a volume allocation command program 515, an I/O program 516, an access load management information collection program 517, a storage apparatus management table 518 for specifying the storage apparatus 200 to be managed, storage extent configuration management information 519 for retaining configuration information of the logical storage extent of the storage apparatus 200 to be managed, network I/F management information 420 for retaining information concerning the data transfer speed of the network I/F 203 of the storage apparatus 200, volume allocation management information 421 for retaining the allocation status of the volume 223 to the host computer 100, volume operation schedule management information 422 for retaining the execution result of the volume operation schedule collection program 511, and volume migration management information 423 for retaining the migration history of the volume 223 among different storage apparatuses 200, which are all described later. These programs, tables and management information are realized by the processor 410 loading such programs, tables and management information from a storage medium (not shown) such as a hard disk into the memory 402, and executing the same. Although not shown, an operating system is loaded into the memory 402 from the storage medium, and the processor 401 executes these programs.

(1-2) Management Information Stored in Respective Apparatuses of First Embodiment FIG. 7 to FIG. 17 show the management information handled in the first embodiment.

(1-2-1) Management Information Stored in Storage Apparatus 200

FIG. 7 to FIG. 11 show examples of the management information stored in the storage apparatus 200.

(1-2-1-1) Volume Management Table 214

FIG. 7 is an example of the volume management table 214 for managing the configuration of the volume 223 in the storage apparatus 200. The volume management table 214 is configured from a volume ID field 214A that registers an identifier for uniquely identifying the volume 223 in the storage apparatus 200, a capacity field 214B that registers the logical storage capacity of the volume 223, an allocation target field 214C that registers an identifier for generally and uniquely identifying the host computer 100 of the allocation target of the volume 223, a controller ID field 214D that registers an identifier for uniquely identifying the controller 202 to which the volume 223 belongs in the storage apparatus 200, a network I/F ID field 214E that registers an identifier for uniquely identifying the network I/F 203 to which the volume 223 belongs in the storage apparatus 200, and an array group ID field 214F that registers the array group 222 configuring the volume 223.

(1-2-1-2) Disk Configuration Management Table 215

FIG. 8 is an example of the disk configuration management table 215 showing the RAID configuration of the disk 221 of the disk device 205 in the storage apparatus 200. The disk configuration management table 215 is configured from an array group ID field 215A that registers an identifier for uniquely identifying the array group 222 in the storage apparatus 200, an array group logical storage capacity field 215B that registers the logical storage capacity of the array group 222, a RAID level field 215C that registers the RAID configuration of the array group 222, a disk ID field 215D that registers an identifier for uniquely identifying the disk 221 configuring the array group 222 in the storage apparatus 200, and a disk physical storage capacity field 215E that registers the physical storage capacity of the disk 221.

(1-2-1-3) Network I/F Management Table 216

Figure 9:
FIG. 9 is a conceptual diagram explaining a network I/F management table.

FIG. 9 is an example of the network I/F management table 216 for retaining the configuration information of the network I/F 203 of the storage apparatus 200. The network I/F management table 216 is configured from a network I/F ID field 216A that registers an identifier for uniquely identifying the network I/F 203 in the storage apparatus 200, a controller ID field 216B that registers an identifier for uniquely identifying the controller 202 to which the network I/F 203 belongs in the storage apparatus 200, and a maximum transfer speed field 216C that registers the maximum data transfer speed (MB/sec) of the network I/F 203.

(1-2-1-4) Power Supply Management Table 217

Figure 10:
FIG. 10 is a conceptual diagram explaining a power supply management table.

FIG. 10 is an example of the power supply management table 217 that retains the power supply status of components in the storage apparatus 200. The power supply management table 217 is configured from a component ID field 217A that registers an identifier for uniquely identifying components in the storage apparatus 200, and a power supply status field 217B that registers the power supply status of components.

(1-2-1-5) Access Load Management Information 218

FIG. 11 is an example of the access load management information 218 of the volume 223 in the storage apparatus 200. The access load management information 218 is configured from a measurement start time field 218A that registers the time in which the measurement of the access load was started, a measurement end time field 218B that registers the time in which the measurement of the access load was ended, a volume ID field 218D that registers an identifier for uniquely identifying the volume 223 subject to access load measurement in the storage apparatus 200, and a transfer speed field 218D that registers the transfer data volume representing, with an average (MB/sec) per second, the data volume (MB) that was sent to and received from the volume 223 during the period from the start to end of the access load measurement.

(1-2-2) Management Information in Management Computer 500

FIG. 12 to FIG. 17 show examples of the management information stored in the management computer 500.

(1-2-2-1) Storage Apparatus Management Table 518

FIG. 12 is an example of the storage apparatus management table 518 for the management computer 500 to specify the storage apparatus 200 to be managed. The storage apparatus management table 518 is configured from a storage apparatus ID field 518A that registers an identifier for uniquely identifying the storage apparatus 200 to be detected in the management computer 500, a type field 518B that registers the type of storage apparatus 200, an apparatus identifying information field 518C that registers apparatus information for uniquely identifying the storage apparatus 200 to be detected through its vendor name, model name, serial number and the like, an IP address field 518D that registers an IP address of the management port 204 for connecting to such management port 204 of the storage apparatus 200 to be detected, and an energy consumption efficiency field 518E that registers the energy consumption efficiency (W/GB).

Here, energy consumption efficiency is the result upon dividing the power consumption (W) of the storage apparatus 200 with the storage capacity (GB). Incidentally, the foregoing information may also be registered in advance by the storage administrator handling the management computer 500. Further, the foregoing information may also be automatically created using a name service or the like on the storage network 400 or the management network 600.

(2-2-2) Storage Extent Configuration Management Information 519

Figure 13:
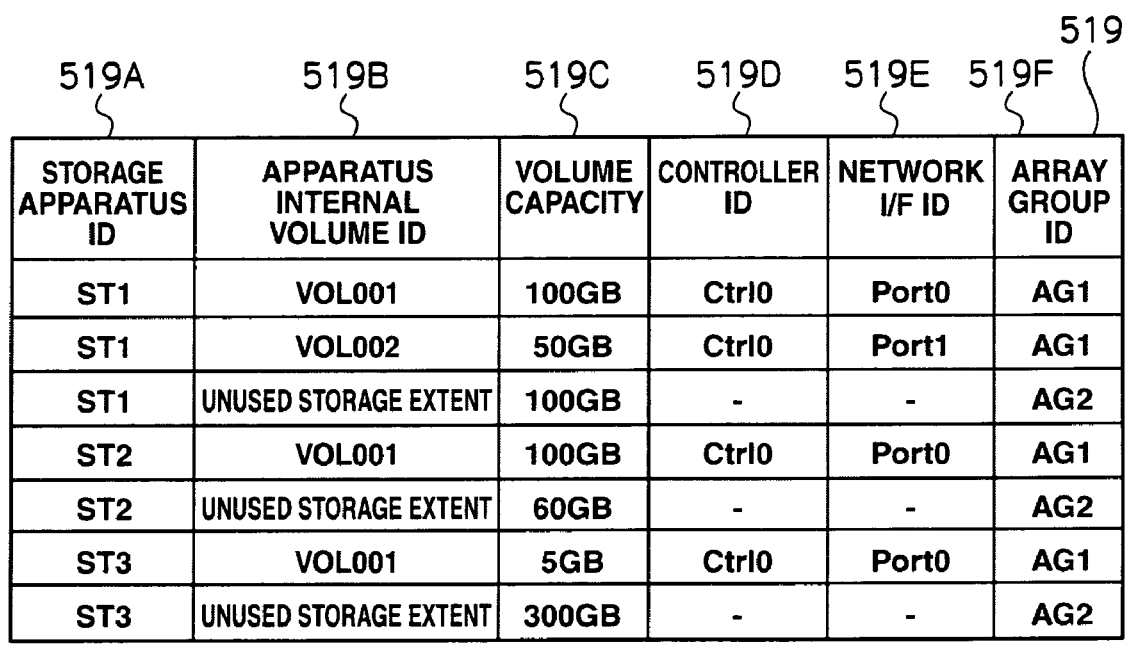
FIG. 13 is a conceptual diagram explaining storage extent configuration management information.

FIG. 13 is an example of the storage extent configuration management information 519 for the management computer 500 to retain the configuration information of the logical storage extent (volume 223, array group 222) in the storage apparatus 200 to be managed. The storage extent configuration management information 519 is configured from a storage apparatus ID field 519A that registers an identifier for uniquely identifying the storage apparatus 200 storing data, an apparatus internal volume ID field 519B that registers an identifier for uniquely identifying the volume 223 in the storage apparatus 200, a volume capacity field 519C that registers the logical storage capacity of the volume 223, a controller ID field 519D that registers an identifier for uniquely identifying the controller 202 to which the volume 223 belongs in the storage apparatus 200, a network I/F ID field 519E that registers an identifier for uniquely identifying the network I/F 203 to which the volume 223 belongs in the storage apparatus 200, an array group ID field 519F that registers an identifier for uniquely identifying the array group 222 configuring the volume 223 in the storage apparatus 200. Incidentally, the unused logical storage extent of the storage apparatus 200 is registered in the volume ID field 519B as an unused storage extent, and the capacity of the unused storage extent in the storage apparatus is registered in the volume capacity field 519C.

(1-2-2-2) Network I/F Management Information 520

FIG. 14 is an example of the network I/F management information 520 for the management computer 500 to retain the configuration of the network I/F 203 of the storage apparatus 200 to be managed. The network I/F management information 520 is configured from a storage apparatus ID field 520A that registers an identifier for uniquely identifying the storage apparatus 200 in the management computer 500, a network I/F ID field 520B that registers an identifier for uniquely identifying the network I/F 203 in the storage apparatus 200, a maximum transfer speed field 520C that registers the maximum data transfer speed available to the network I/F 203, and a threshold value field 520D that registers the threshold value of the available data transfer speed that is available to the network I/F 203. Incidentally, the maximum data transfer speed of the network I/F 203 is registered by executing the network I/F load threshold value collection program 512.

(1-2-2-3) Volume Allocation Management Information 521

FIG. 15 is an example of the volume allocation management information 521 for the management computer 500 to manage the allocation status of the volume 223 in the management-target storage apparatus 200 to the host computer 100. The volume allocation management information 521 is configured from a global volume ID field 521A that registers an identifier for uniquely identifying the allocated volume 223, an allocation target field 521B that registers an identifier for uniquely identifying the host computer 100 of the allocation target of the volume 223, a storage apparatus ID field 521C that registers an identifier for uniquely identifying the storage apparatus 200 to which the volume 223 belongs in the management computer 500, an apparatus internal volume ID field 521D that registers an identifier for uniquely identifying the volume 223 in the storage apparatus 200, and an allocation capacity field 521E that registers the logical storage capacity to the allocated to the volume 223.

(1-2-2-4) Volume Operation Schedule Management Information 522

FIG. 16 is an example of the volume operation schedule management information 522 for the management computer 500 to management the operation schedule to the volume 223. Here, a volume operation schedule shall mean an access load plan per time frame including the requested data transfer speed requested by the host computer 100 using the volume 223 upon accessing the volume 223, which is collected by the host administrator using the volume operation schedule collection program 511, or the periodical access load tendency to the volume 223 calculated based on the access load management information 218 in the storage apparatus 200. The volume operation schedule management information 522 is configured from a global volume field 522A that registers an identifier for uniquely identifying the volume 223, and an operation schedule field 522B that registers the operation schedule. The operation schedule field 522B is configured from a day field 522C that registers the day(s) of the operation schedule, a time field 522D that registers the time of the operation schedule, and a requested transfer speed field 522E that registers the requested data transfer speed of the operation schedule.

(1-2-2-5) Volume Migration Management Information 523

FIG. 17 is an example of the volume migration management information 523 for the management computer 500 to manage the migration of the volume 223 between different storage apparatuses 200. The volume migration management information 523 is configured from a start time field 523A that registers the time (start time) that the volume migration request was sent from the management computer 500 to the volume migration computer 700, a completion time field 523B that registers the time (completion time) when the management computer 500 received the volume migration completion notice from the volume migration computer 700, a global volume ID field 523C that registers an identifier for uniquely identifying the volume 223 to be migrated, a migration source storage apparatus ID field 523D that registers an identifier capable of uniquely identifying the migration source storage apparatus 200 in the management computer 500, a migration source apparatus internal volume ID field 523E that registers an identifier capable of uniquely identifying the migration source volume 233 in the migration source storage apparatus 200, a migration target storage apparatus ID field 523F that registers an identifier capable of uniquely identifying the migration target storage apparatus 200 in the management computer 500, and a migration target apparatus internal volume ID field 523G that registers an identifier capable of uniquely identifying the migration target volume 233 in the migration target storage apparatus 200.

(1-3) Detailed Explanation of Program Flowchart in First Embodiment (1-3-1) Program Stored in Storage Apparatus 200

The flow of the power supply control program 211, the storage extent control program 212 and the access load measurement program 213, which are programs of the storage apparatus 200 in the first embodiment, is now explained.

(1-3-1-1) Power Supply Control Program 211

The power supply control program 211 is a program that is executed by the controller 202 when the storage apparatus 200 receives the power supply control request sent from the management computer 500 via the management network 600. Specifically, with the power supply control program 211, when the storage apparatus 200 receives the power supply control request, the controller 202 sends a control signal to the power supply control circuit 207 in order to change the power supply of the components to the status designated in the request. Thereafter, the power supply control program 211 updates the power supply management table 217, and ends the processing. Further, when an access request to the volume 223 is sent from the host computer 100 or the volume migration computer 700, the controller 202 executes the power supply control program 211 and sends to the power supply control circuit 207 a control signal for turning on the power supply of the components relating to the volume 223, updates the power supply management table 217, and ends the processing.

(1-3-1-2) Storage Extent Control Program 212

The storage extent control program 212 is a program to be executed by the controller 202 when the storage apparatus 200 receives the creation/deletion request of the logical storage extent (array group 222 and volume 223) and the volume allocation request sent from the management computer 500. Here, the volume allocation request includes the designation of the controller 202 and the network I/F 203 to be passed through upon allocating the volume 223 to the host computer 100. Further, the storage extent control program 212 returns the configuration information and unused storage capacity of the logical storage extent in the storage apparatus 200 in response to the storage extent configuration information acquisition request sent from the management computer 500.

(1-3-1-3) Access Load Measurement Program 213

The access load measurement program 213 is a program for measuring the transfer speed (MB/sec), which is a representation of the data volume (MB) that was sent to and received from the volume 223 based on an average (MB/sec) per second. Specifically, with the access load measurement program 213, when the storage apparatus 200 receives the access load measurement request from the management computer 500, the controller 202 measures the sent and received data volume (MB) of the designated volume 223 during the period commanded in the access load measurement request, registers the value divided with the measured period (sec) in the access load management information 218, and ends the processing.

(1-3-2) Program Stored in Volume Migration Computer 700

The flow of the volume migration execution program 711, which is a program stored in the volume migration computer 700 in the first embodiment, is now explained.

(1-3-2-1) Volume Migration Execution Program 711

The volume migration execution program 711, for instance, is a program to be executed in an independent volume migration computer 700 that receives the command parameter via the management computer 500 and the management network 600. As a result of the processor 701 executing this program, it migrates the volume 233 between the storage apparatuses 200 via the storage network 400. The volume migration execution program 711 can designate copy, swap, and difference copy as the migration means of the volume 223 between the storage apparatuses 200. Here, the volume 223 is an aggregate of blocks in 512 byte units storing data.

For example, when copy is designated as the migration means in the volume migration request, the volume migration execution program 711 copies all blocks in order from the top block of the migration source volume 223 to the migration target volume 223. When swap is commanded as the migration means in the volume migration request, the volume migration execution program 711 exchanges all blocks in order from the top block of the migration source volume 223 and the migration target volume 223. When difference copy is commanded as the migration means in the volume migration request, the volume migration execution program 711 compares each block from the top block of the migration source volume 223 and the migration target volume 223, and, when the contents of the blocks are different, copies the block of the migration source volume 223 to the block of the migration target volume 223.

(1-3-3) Program Stored in Management Computer 500

The flow of the volume operation schedule collection program 511, the network I/F load threshold value collection program 512, the power supply control command program 513, the configuration information collection program 514, the volume allocation command program 515, the I/O program 516 and the access load management information collection program 517, which are programs stored in the management computer 500 in the first embodiment, is now explained.

(1-3-3-1) I/O Program 516

The I/O program 516 is a program for outputting an input request to the volume operation schedule collection program 511 or the volume allocation command program 515 described later to the output unit 504 of the management computer 500, and starting the volume operation schedule collection program 511 or the volume allocation command program 515 upon receiving the execution command to the volume operation schedule collection program 511 or the volume allocation command program 515 based on operations of the input unit 505 by the host administrator or the storage administrator. Incidentally, in the present embodiment, although the input request is described as being displayed on a screen as shown in FIG. 18 or FIG. 20 described later, the input request is not limited thereto, and may be batch processing based on the entry of a configuration file or processing based on a command input.

(1-3-3-2) Network I/F Load Threshold Value Collection Program 512

The network I/F load threshold value collection program 512 is a program for providing the network I/F load threshold value setting screen 800 to the storage administrator, collecting the threshold values of the data transfer speed of each network I/F 203 of the storage apparatus 200, and updating the network I/F management information 520.

Figure 18:
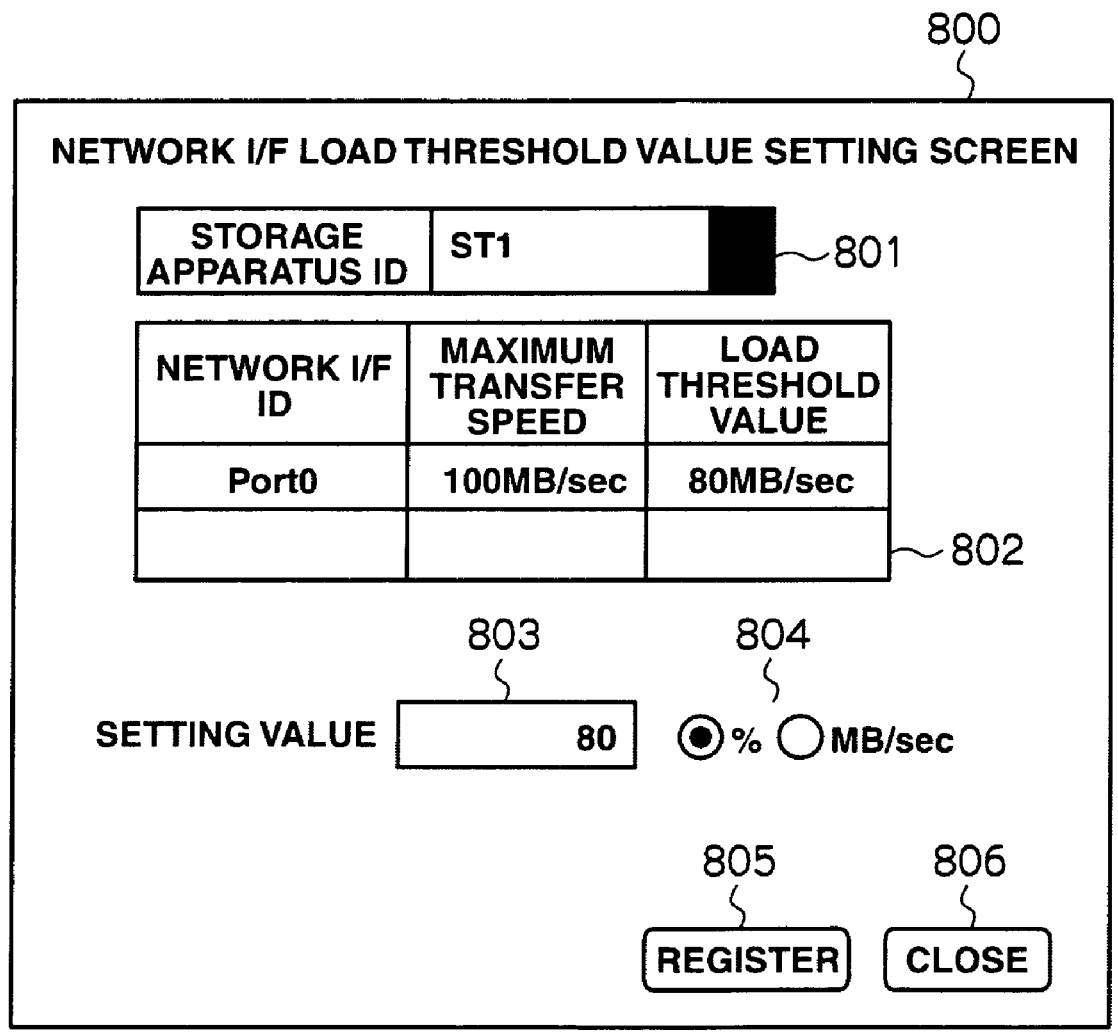
FIG. 18 is a conceptual diagram explaining a network I/F load threshold value setting screen.

FIG. 18 is an example of the network I/F load threshold value setting screen 800. The network I/F load threshold value setting screen 800 is configured from a storage apparatus ID selection field 801 for selecting the storage apparatus ID of the storage apparatus 200, a network I/F selection field 802 for displaying a list of the network I/F IDs of the network I/Fs 203 in the selected storage apparatus 200 and selecting the network I/F ID, a threshold value field 803 for inputting the threshold value of the data transfer speed of the network I/F ID of the selected network I/F 203, a speed unit selection field 804 for selecting whether to make the value to be input to the threshold value field 803 a data transfer speed (MB/sec), or a maximum utilization factor (%) of the maximum transfer speed, a register button 805 for registering the input information, and an end button 806 for abandoning the input information and closing the screen. Incidentally, FIG. 18 shows an example of the network I/F load threshold value setting screen, and does not define the entirety thereof.

(1-3-3-3) Configuration Information Collection Program 514

The configuration information collection program 514 is a program for collecting volume configuration information from the management-target storage apparatus 200, and is a program that is periodically executed by the processor 501 of the management computer 500, or executed by the processor 501 of the management computer 500 based on a command from the storage administrator or a command from another program stored in the management computer 500. Specifically, the configuration information collection program 514 issues a configuration information acquisition command using an IP address of the IP address field 518D of the storage apparatus management table 518 to the plurality of storage apparatuses 200 registered in the storage apparatus management table 518, acquires the value of the volume management table 214 stored in the storage apparatus 200, and copies the acquired value of the volume management table 214 in a corresponding field of the volume allocation management information 521 in the management computer 500.

Meanwhile, the configuration information collection program 514 copies the value of the unallocated storage extent shown in the acquired volume management table 214 in the corresponding field of the storage extent configuration management information 519. Thereby, the management computer 500 is able to update the value of the volume configuration information of the storage apparatus 200 to be managed to the latest value by using the configuration information collection program 514.

(1-3-3-4) Volume Allocation Command Program 515

The volume allocation command program 515 is a program for preferentially creating a new volume in the storage apparatus in which the main power supply is currently turned on and having a small energy consumption efficiency value in response to the new volume allocation request issued based on operations of the input unit 505 by the host administrator or the storage administrator.

Figure 19:
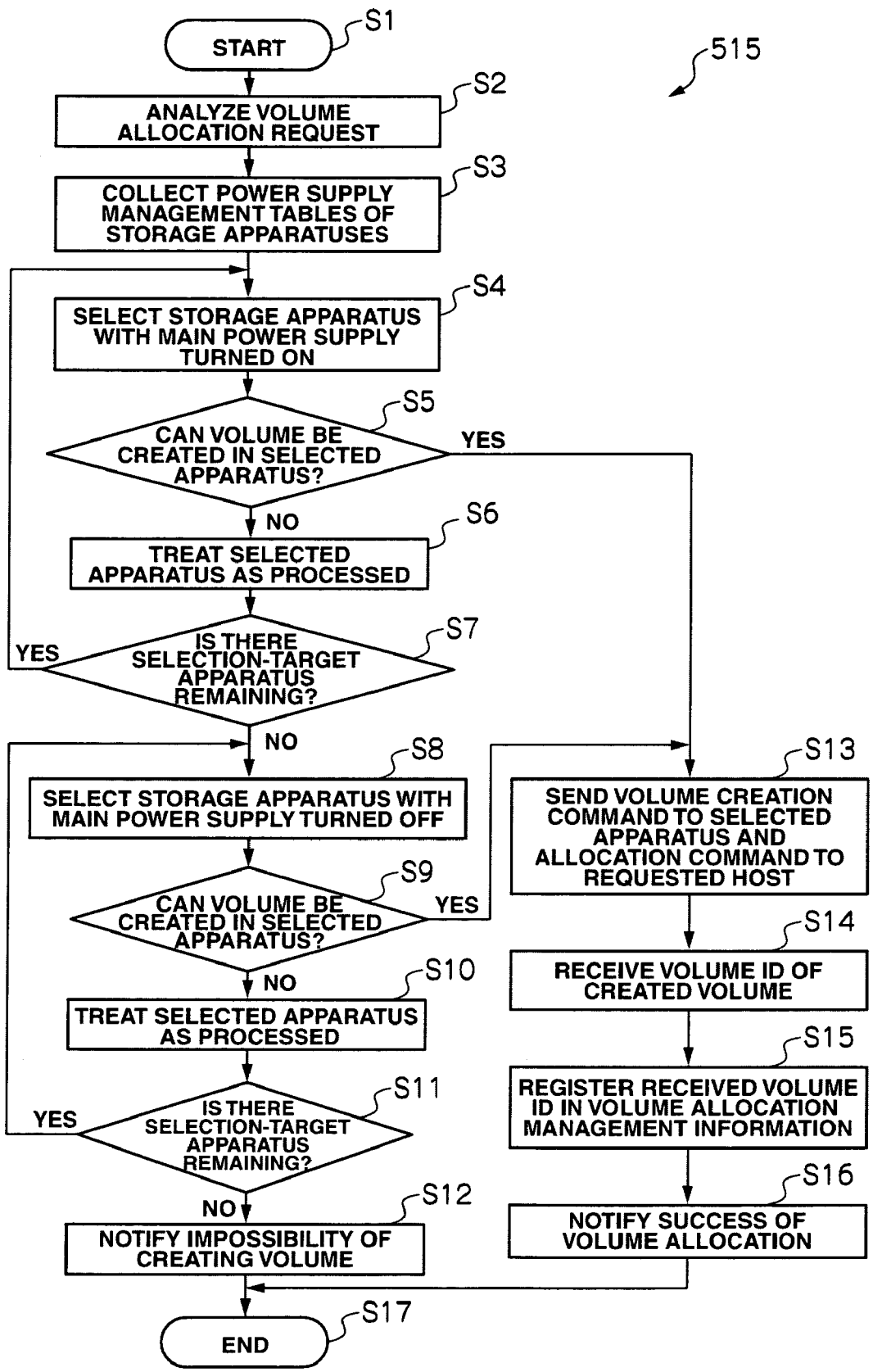
FIG. 19 is a flowchart explaining a volume allocation command processing routine.

FIG. 19 shows a flowchart of the volume allocation command program 515. When the storage administrator inputs into the management computer 500 a new volume allocation request to the host computer 100, the volume allocation command program 515 starts volume allocation command processing (step S1), and analyzes the capacity of the new volume, the allocation target and the initial data transfer speed from the volume allocation request (step S2).

Subsequently, the volume allocation command program 515 collects the power supply management tables 217 from all storage apparatuses 200 to be managed (step S3), and selects a storage apparatus 200 in which the volume 223 is to be created among the storage apparatuses with the main power supply turned on (step S4).

The volume allocation command program 515 thereafter refers to the storage extent configuration management information 519, the network I/F management information 520, and the volume operation schedule management information 522 and determines whether it is possible to create the volume 223 having the requested capacity and initial data transfer speed in the selected storage apparatus 200 (step S5). Here, the volume allocation command program 515 executes step S13 onward when it is determined that the volume 223 can be created (step S5: YES). Contrarily, the volume allocation command program 515 treats the selected storage apparatus 200 as processed when it is determine that the volume 223 cannot be created (step S5: NO) (step S6).

Subsequently, the volume allocation command program 515 determines whether there is any remaining storage apparatus 200 to be selected with the main power supply turned on (step S7). Here, the volume allocation command program 515 returns to step S4 when it is determined that there is a remaining storage apparatus 200 to be selected (step S7: YES). Further, the volume allocation command program 515 executes step S8 onward when it is determined that there is no remaining storage apparatus 200 to be selected (step S7: NO).

The volume allocation command program 515 thereafter selects a storage apparatus 200 with the main power supply turned off (step S8), and, as with step S5, determines whether the requested volume 223 can be created in the selected storage apparatus 200 (step S9). Here, the volume allocation command program 515 executes step S13 onward when it is determined that the volume 223 can be created (step S9: YES). Contrarily, the volume allocation command program 515 treats the selected storage apparatus 200 as processed when it is determined that the volume 223 cannot be created (step S9: NO) (step S10).

Subsequently, the volume allocation command program 515 determines whether there is any storage apparatus 200 to be selected with main power supply turned off (step S11). Here, the volume allocation command program 515 returns to step S8 when it is determined that there is a remaining storage apparatus 200 to be selected (step S11: YES). Further, when it is determined that there is no remaining storage apparatus 200 to be selected (step S11: NO), the volume allocation command program 515 notifies the impossibility of creating the volume to the requesting host computer 100 or the storage apparatus 200 so as to notify the host administrator or the storage administrator (step S12), and thereafter ends this volume allocation command processing (step S17).

Meanwhile, when it is determined at step S5 or step S9 that the requested volume 223 can be created (step S5: YES, step S9: YES), the volume allocation command program 515 sends a volume creation command to the selected storage apparatus 200 and an allocation command to the requested host computer 100 (step S13), receives a volume ID of the created volume 223 from the storage apparatus 223 that received the command (step S14), registers a new volume 223 in the volume allocation management information 521 (step S15), and notifies the success of volume allocation to the requesting host computer 100 or the storage apparatus 200 so as to notify the host administrator or the storage administrator (step S16), and thereafter ends this volume allocation command processing (step S17).

Here, when selecting the storage apparatus 200 in which the new volume 223 is to be created (step S5, step S9), the volume allocation command program 515 may also refer to the storage apparatus management table 518 and preferentially select a storage apparatus 200 with a small energy consumption efficiency value in the energy consumption efficiency field 518E.

(1-3-3-5) Access Load Management Information Collection Program 517

The access load management information collection program 517 is a program for sending an access load measurement request of the volume 223 to the storage apparatus 200, and collecting the access load management information 218 from the storage apparatus 200. The access load management information collection program 517 is executed by the storage administrator or another program, or is executed periodically.

(1-3-3-6) Volume Operation Schedule Collection Program 511

The volume operation schedule collection program 511 is a program for displaying the volume operation schedule input screen 810 to the host administrator or the storage administrator, urging the setting of the operation schedule of the volume 223, and registering the received information in the volume operation schedule management information 522.

FIG. 20 is an example of the volume operation schedule input screen 810. The volume operation schedule input screen 810 is configured from a global volume ID field 811 for selecting the global ID of the volume 223, an access load status field 812 for displaying the configuration information and the past access load status of the selected volume 223, an operation schedule field 813 for registering the operation schedule, operation time fields 814, 815 for inputting the operation time, a requested data transfer speed field 816 for inputting the requested data transfer speed, a register button 817, and an cancel button 818.

FIG. 21 is an example of the volume operation schedule release screen 820. The volume operation schedule release screen 820 is configured from a global volume ID field 821 for selecting the global volume ID of the volume 223, an operation schedule selection field 822 for displaying a list of the operation schedule set in the selected volume 223 for selecting such operation schedule, a release button 823 for releasing the operation schedule, and an end button 824 for abandoning the selected information and closing the screen. FIG. 20 and FIG. 21 are examples of the volume operation schedule input screen and the volume operation schedule release screen, and, without limitation thereto, the setting and release of volume operation schedules based on days, months and years are also possible.

(1-3-3-7) Power Supply Control Command Program

The power supply control command program 513 is a program for sending a command for migrating the volume 223 in which the requested data transfer speed is 0 (MB/sec) to a storage apparatus 200 with a low energy consumption efficiency value (volume migration command processing), and sending a command for turning off the main power supply of the storage apparatus 200 in which an access load will not arise to the volume 223 (power supply control command processing) by referring to the volume operation schedule of the volume operation schedule management information 522 and the energy consumption efficiency of the storage apparatus management table 518. The power supply control command program 513 is executed based on the command of the storage administrator, or at a time in which the requested data transfer speed value of any volume 223 in the volume operation schedule management information 522.

Figure 22:
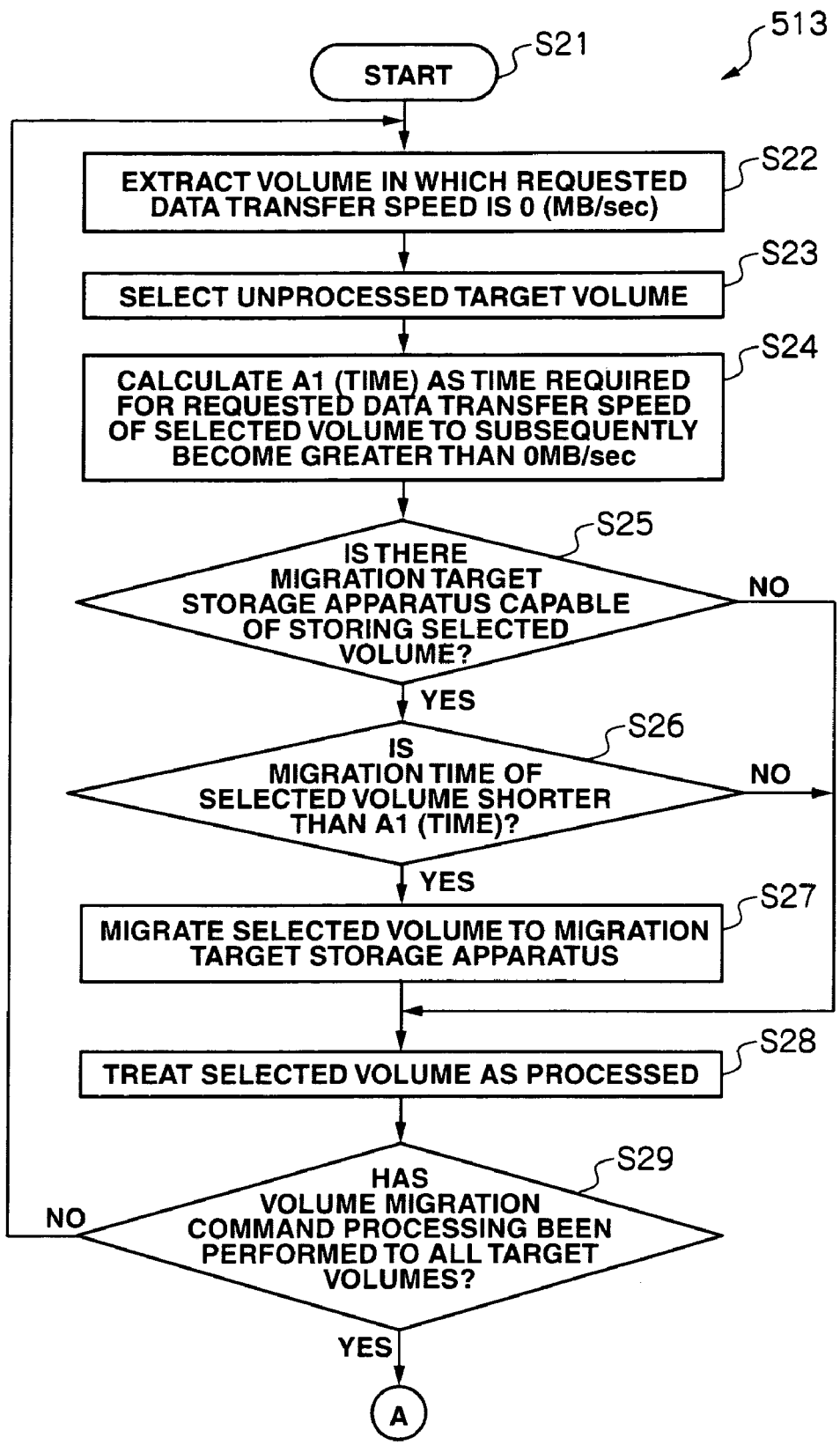
FIG. 22 is a flowchart explaining a power supply control command processing routine.

FIG. 22 shows a flowchart of the volume migration command processing of the power supply control command program 513. Upon receiving a command based on operations of the input unit 505 by the storage administrator, or when the time in which the requested data transfer speed value of the volume 223 fluctuates in the volume operation schedule management information 522, the power supply control command program 513 starts the volume migration command processing of the power supply control command processing (step S21), refers to the volume operation schedule management information 522, and extracts the volume 223 in which the requested data transfer speed at the program execution time is 0 (MB/sec) (step S22).

Subsequently, the power supply control command program 513 selects one volume 223 from the unprocessed volumes 223 extracted based on the processing at step S22 (step S23). The power supply control command program 513 thereafter calculates A1 (time) as the time in which the requested data transfer speed of the selected volume 223 becomes greater than 0 (MB/sec) by referring to the volume operation schedule management information 522 (step S24).

Next, the power supply control command program 513 determines whether there is a migration target storage apparatus 200 capable of storing the selected volume 223 (step S25). Here, with the migration target storage apparatus 200, it is essential that the data transfer speed of the network I/F 203 does not exceed the threshold value even when storing the selected volume 223. Further, the migration target storage apparatus 200 may also be preferentially selected based on the low energy consumption efficiency value of the storage apparatus management table 518.

Here, the power supply control command program 513 executes step S28 when there is no applicable migration target storage apparatus (step S25: NO). Contrarily, when there is an applicable migration target storage apparatus (step S25: YES), the power supply control command program 513 calculates the migration time required for migrating the selected volume 223 to the migration target storage apparatus 200, and determines whether this migration time is shorter than A1 (time) (step S26).

Here, when the migration time is shorter than A1 (time) (step S26: YES), the power supply control command program 513 sends a command for migrating the selected volume 223 to the migration target storage apparatus 200 (step S27). Contrarily, the power supply control command program 513 executes step S28 when the migration time is longer than A1 (time) (step S26: NO). Eventually, the power supply control command program 513 treats the selected volume 223 as processed (step S28).

Subsequently, the power supply control command program 513 determines whether the volume migration command processing has been executed to all volumes 223 to be the target of volume migration command processing (step S29). Here, when it is determined that the volume migration command processing has not been executed to all volumes 223 to be the target of volume migration command processing (step S29: NO), the power supply control command program 513 returns to step S22. Contrarily, when it is determined that the volume migration command processing has been executed to all volumes 223 to be the target of volume migration command processing (step S29: YES), the power supply control command program 513 thereafter ends this volume migration command processing, and executes power supply control command processing.

Figure 23:
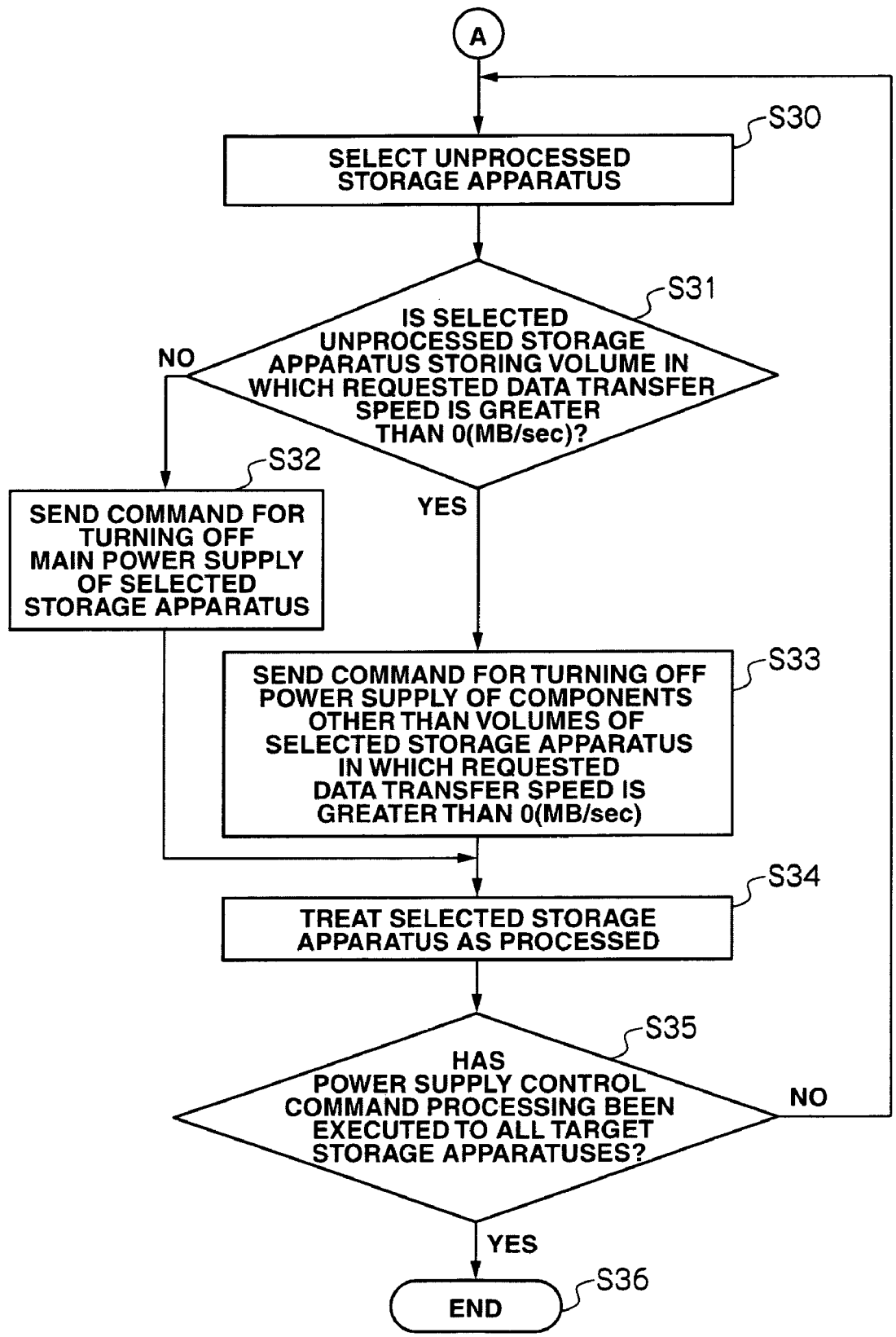
FIG. 23 is a flowchart explaining a power supply control command processing routine.

FIG. 23 shows a flowchart of power supply control command processing of the power supply control command program 513. The power supply control command program 513 selects a storage program 200 that has not yet been subject to power supply control command processing from the management-target storage apparatus 200 by referring to the storage apparatus management table 518 (step S30). Subsequently, the power supply control command program 513 determines whether the selected storage apparatus 200 stores a volume 223 in which the requested data transfer speed is greater than 0 (MB/sec) by referring to the volume operation schedule management information 522 (step S31).

Here, when it is determined that no such volume 223 is stored (step S31: NO), the power supply control command program 513 sends to the storage apparatus 200 a command for turning off the main power supply of the selected storage apparatus 200 (step S32). Contrarily, when it is determined that such a volume 223 is stored (step S31: YES), the power supply control command program 513 sends a command for turning off the power supply of components other than those related to the volume 223 in which the requested data transfer speed of the selected storage apparatus 200 is greater than 0 (MB/sec) (step S33).

Eventually, the power supply control command program 513 treats the selected storage apparatus 200 as subject to power supply control command processing (step S34). Subsequently, the power supply control command program 513 determines whether power supply control command processing has been executed to all storage apparatuses 200 to be subject to power supply control command processing (step S35). Here, when it is determined that the power supply control command processing has not been executed to all storage apparatuses 200 to be subject to power supply control command processing (step S35: NO), the power supply control command program 513 returns to step S30. Contrarily, when it is determined that the power supply control command processing has been executed to all storage apparatuses 200 to be subject to power supply control command processing (step S35: YES), the power supply control command program 513 thereafter ends this power supply control command processing (step S36).

Migration of the volume 223 is now explained. Here, when the migration time of volume 223 is "T" (sec), the migration capacity of the volume 223 is "C" (MB), and the data transfer speed is "V" (MB/sec),

[Formula 1]

$$T \equiv \frac{C}{V} \quad (1)$$

can be used to seek the migration time. In the first embodiment, all copy, swap and difference copy can be used as the volume migration means, and, at step S26 of the volume migration command processing, the volume migration means with the minimum migration capacity among the foregoing three volume migration means. Thereby, in this embodiment, it is possible to reduce the power consumption arising during the volume migration operation.

Figure 24:
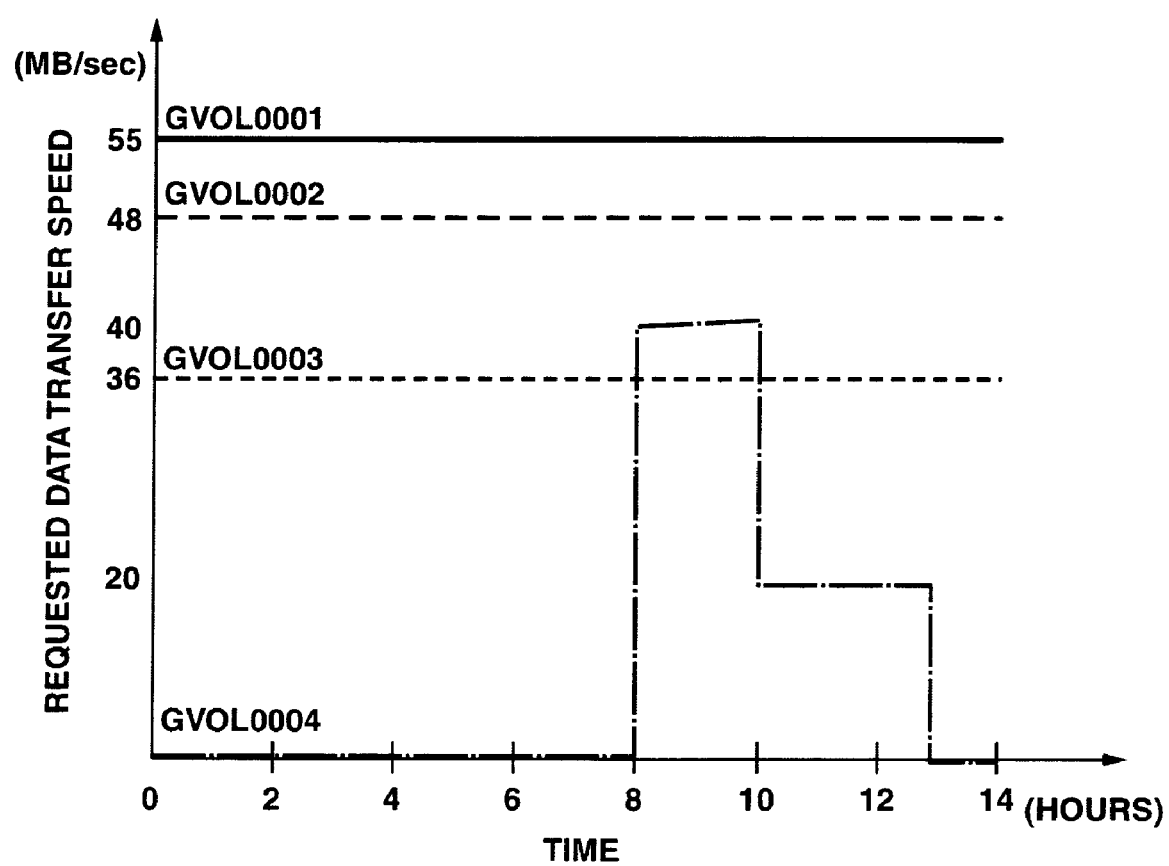
FIG. 24 is a conceptual diagram explaining the execution process of power supply control command processing.

(1-4) Explanation of Specific Power Supply Control Command Program 513 of First Embodiment A specific example of the power supply control command program 513 in the first embodiment is now explained. For instance, this is a specific example of the power supply control command program 513 where, in the first embodiment, the configuration of the computer system 1 is shown in FIG. 1, the storage apparatus management table 518 of the management computer 500 is shown in FIG. 12, the storage extent configuration management information 519 is shown in FIG. 13, the volume allocation management information 521 is shown in FIG. 15, and the volume operation schedule management information per global volume with the horizontal axis of the volume operation schedule management information 522 as the time and the vertical axis as the requested data transfer speed is shown in FIG. 24. Further, this specific example illustrates a case of showing the network I/F management information 520 in FIG. 14 and showing the storage apparatus management table 518 in FIG. 12.

Foremost, the power supply control command program 513 selects a volume 223 having a global volume ID "GVOL0004" at 0 (time) as the volume 223 in which the requested data transfer speed becomes 0 (MB/sec) regarding the volume migration command processing by referring to the volume operation schedule management information shown in FIG. 24 (step S23).

Subsequently, the power supply control command program 513 calculates A1 (time), which is the time until the requested data transfer speed of the volume 223 having the global volume ID "GVOL0004" subsequently becomes greater than 0 (MB/sec), to 8 (hours) by referring to the volume operation schedule management information shown in FIG. 24 (step S24).

The power supply control command program 513 thereafter confirms that the volume 223 having the global volume ID "GVOL0004" can be stored in the storage apparatus 200 having the storage apparatus ID "ST2" (step S25).

In other words, by referring to the storage apparatus management table 518 shown in FIG. 12, the power supply control command program 513 confirms the existence of the storage apparatuses 200 having the storage apparatus IDs "ST1", "ST2", which are the storage apparatuses 200 having a smaller energy consumption efficiency value than the storage apparatus 200 having the storage apparatus ID "ST3" storing the volume 223 having the global volume ID "GVOL0004".

Further, the power supply control command program 513 confirms that the volume 223 having the global volume IDs "GVOL0001" and "GVOL0002" is allocated to the storage apparatus 200 having the storage apparatus ID "ST1".

Moreover, by referring to the network I/F management information 520 shown in FIG. 14, the power supply control command program 513 confirms the existence of the network I/Fs 203 having the network I/F IDs "Port0" and "Port1" in the storage apparatus 200 having the storage apparatus ID "ST1", and confirms that the threshold value of the requested data transfer speed of the network I/Fs 203 having the network I/F ID "Port0" and "Port1" is set to 80 (MB/sec).

Further, by referring to the storage extent configuration management information 519 shown in FIG. 13, the power supply control command program 513 confirms that the volume 223 having the apparatus internal volume ID "VOL001" in the storage apparatus 200 having the storage apparatus ID "ST1" as the volume 223 having the global volume ID "GVOL0001" is allocated to the network I/F 203 having the network I/F ID "Port1".

Similarly, the power supply control command program 513 confirms that the volume 223 having the apparatus internal volume ID "VOL002" in the storage apparatus 200 having the storage apparatus ID "ST1" as the volume 223 having the global volume ID "GVOL0002" is allocated to the network I/F 203 having the network I/F ID "Port1".

Here, by referring to the volume operation schedule management information shown in FIG. 24, the power supply control command program 513 confirms that the maximum requested data transfer speed during the period in which requested data transfer speed of the volume 223 having the global volume ID "GVOL0004" to subsequently become greater than 0 (MB/sec) is 40 (MB/sec).

Further, by referring to the volume operation schedule management information shown in FIG. 24, the power supply control command program 513 confirms that the requested data transfer speed of the volume 223 having the global volume ID "GVOL0001" during such period is 55 (MB/sec).

Similarly, by referring to the volume operation schedule management information shown in FIG. 24, the power supply control command program 513 confirms that the requested data transfer speed of the volume 223 having the global volume ID "GVOL0002" during such period is 48 (MB/sec).

Accordingly, the power supply control command program 513 confirms that the volume 223 cannot be stored in the storage apparatus 200 having the storage apparatus ID "ST1" since the requested data transfer speed becomes 55 (MB/sec)+40 (MB/sec)=95 (MB/sec) when the volume 223 having the global volume ID "GVOL0004" is allocated to the network I/F 203 having the network I/F ID "Port0" in the storage apparatus 200 having the storage apparatus ID "ST1" and exceeds the threshold value of the requested data transfer speed of the network I/F 203, and the requested data transfer speed becomes 48 (MB/sec)+40 (MB/sec)=88 (MB/sec) when the volume 223 having the global volume ID "GVOL0004" is allocated to the network I/F 203 having the network I/F ID "Port1" and similarly exceeds the threshold value of the requested data transfer speed of the network I/F 203.

Meanwhile, by referring to the volume allocation management information 521, the power supply control command program 513 confirms that the volume 223 having the global volume ID "GVOL0003" is allocated to the storage apparatus 200 having the storage apparatus ID "ST2".

Further, by referring to the network I/F management information 520 shown in FIG. 14, the power supply control command program 513 confirms the existence of the network I/F 203 having the network I/F ID "Port0" in the storage apparatus 200 having the storage apparatus ID "ST2", and that the threshold value of the requested data transfer speed of the network I/F 203 having the network I/F ID "Port0" is set to 80 (MB/sec).

Moreover, by referring to the storage extent configuration management information 519 shown in FIG. 13, the power supply control command program 513 confirms that the volume 223 having the apparatus internal volume ID "VOL001" in the storage apparatus 200 having the storage apparatus ID "ST1" as the volume 233 having the global volume ID "GVOL0003" is allocated to the network I/F 203 having the network I/F ID "Port0".

Here, by referring to the volume operation schedule management information shown in FIG. 24, the power supply control command program 513 confirms that the requested data transfer speed of the volume 223 having the global volume ID "GVOL0003" during the period in which the requested data transfer speed of the volume 223 having the global volume ID "GVOL0004" subsequently becomes greater than 0 (MB/sec) is 36 (MB/sec).

Further, by referring to the volume allocation management information 521 shown in FIG. 15, the power supply control command program 513 confirms that the allocation capacity of the volume 223 having the global volume ID "GVOL0003" is 5 (GB), and, by referring to the storage extent configuration management information 519 shown in FIG. 13, confirms that the unused storage extent of the storage apparatus 200 having the storage apparatus ID "ST2" is 60 (GB).

Accordingly, the power supply control command program 513 confirms that the volume 223 having the global volume ID "GVOL0004" can be stored in the storage apparatus 200 having the storage apparatus ID "ST2" since the requested data transfer speed will become 36 (MB/sec)+40 (MB/sec)=76 (MB/sec) when the volume 223 having the global volume ID "GVOL0004" is allocated to the network I/F 203 of the network I/F ID "Port0" in the storage apparatus 200 having the storage apparatus ID "ST2", and the volume 223 having the global volume ID "GVOL0004" is allocated to the unused storage extent, whereby no problems will arise regarding the volume capacity and the threshold value of the requested data transfer speed of the network I/F 203.

Subsequently, the power supply control command program 513 calculates the migration time required to migrate the volume 223 having the global volume ID "GVOL0004" to the storage apparatus 200 having the storage apparatus ID "ST2", and confirms that this migration time is shorter than A1 (time), which is 8 (hours) (step S26).

In other words, the power supply control command program 513 confirms that the threshold value of the requested data transfer speed of the network I/F 203 having the network I/F ID "Port0" in the storage apparatus 200 having the storage apparatus ID "ST2" is 80 (MB/sec), and that the data transfer speed available for the volume migration becomes 80 (MB/sec)−36 (MB/sec)=44 (MB/sec) since the requested data transfer speed of the volume 223 having the global volume ID "GVOL0003" is 36 (MB/sec).

Further, by referring to the volume migration management information 523 shown in FIG. 17, the power supply control command program 513 confirms that the volume migration means is full copy since there is no migration from the storage apparatus 200 having the storage apparatus ID "ST3" of the volume 223 having the global volume ID "GVOL0004" to the storage apparatus 200 having the storage apparatus ID "ST2".

Moreover, by referring to the volume allocation management information 521 shown in FIG. 15, the power supply control command program 513 confirms that the allocation capacity of the volume 223 having the global volume ID "GVOL0004" is 5 (GB).

Accordingly, the power supply control command program 513 calculates that the migration time required for migrating the volume 223 having the global volume ID "GVOL0004" to the storage apparatus 200 having the storage apparatus ID "ST2" is 5 (GB)/44 (MB/sec)=113 (sec)≈2 (minutes), and confirms that this migration time is shorter than A1 (time), which is 8 (hours).

Subsequently, the power supply control command program 513 sends a command for migrating the volume 223 having the global volume ID "GVOL0004" to the storage apparatus 200 having the storage apparatus ID "ST2" (step S27).

The power supply control command program 513 thereafter selects the storage apparatus 200 having the storage apparatus ID "ST1" regarding the power supply control command processing (step S30).

Here, by referring to the volume allocation management information 521 shown in FIG. 15 and the volume operation schedule management information shown in FIG. 24, the power supply control command program 513 confirms that the volume 223 having a requested data transfer speed that is greater than 0 (MB/sec) is stored in the storage apparatus 200 having the storage apparatus ID "ST1" (step S31).

Accordingly, the power supply control command program 513 executes power supply control command processing of components other than those relating to the volume 223 in which the requested data transfer speed of the storage apparatus 200 having the storage apparatus ID "ST1" is greater than 0 (MB/sec) (step S32).

In other words, by referring to the storage extent configuration management information 519 shown in FIG. 13, the power supply control command program 513 confirms that the volume 223 does not exist in the array group "AG2". Thereby, if the disk configuration management table 215 of the storage apparatus 200 having the storage apparatus ID "ST1" is as shown in FIG. 8, since the power supply of the disks 231 having the disk IDs "Disk005", "Disk006", "Disk007" configuring the array group "AG2" can be turned off, the power supply control command program 513 sends the power supply turn-off request to the storage apparatus 200 having the storage apparatus ID "ST1" (step S33), and, as a result, turns off the power supply of the disks 231 having the disks IDs "Disk005", "Disk006", "Disk007", and thereafter treats the storage apparatus 200 having the storage apparatus "ST1" has subject to power supply control command processing (step S34).

Subsequently, the power supply control command program 513 selects the storage apparatus 200 having the storage apparatus ID "ST2" regarding the power supply control command processing (step S30). Since the storage apparatus 200 having the storage apparatus ID "ST2" is subject to the same processing as the storage apparatus 200 having the storage apparatus ID "ST1", the explanation thereof is omitted.

The power supply control command program 513 thereafter selects the storage apparatus 200 having the storage apparatus ID "ST3" regarding the power supply control command processing (step S30).

Here, by referring to the volume allocation management information 521 shown in FIG. 15 and the volume operation schedule management information shown in FIG. 24, the power supply control command program 513 confirms that the volume 223 having a requested data transfer speed that is greater than 0 (MB/sec) is stored in the storage apparatus 200 having the storage apparatus ID "ST3" (step S31) since the volume 223 having the global volume ID "GVOL0004" has been migrated from the storage apparatus 200 having the storage apparatus ID "ST3" to the storage apparatus 200 having the storage apparatus ID "ST2" (step S27).

Accordingly, since the main power supply 209 of the storage apparatus 200 having the storage apparatus ID "ST3" can be turned off, the power supply control command program 513 sends a power supply turn-off request to the storage apparatus 200 having the storage apparatus ID "ST3" (step S32), and, as a result, turns off the main power supply 209 of the storage apparatus 200 having the storage apparatus ID "ST3" and turns on the standby power supply 210, and thereafter treats the storage apparatus 200 having the storage apparatus "ST3" as subject to the power supply control command processing (step S34), and ends this power supply control command processing (step S36).

Figure 25:
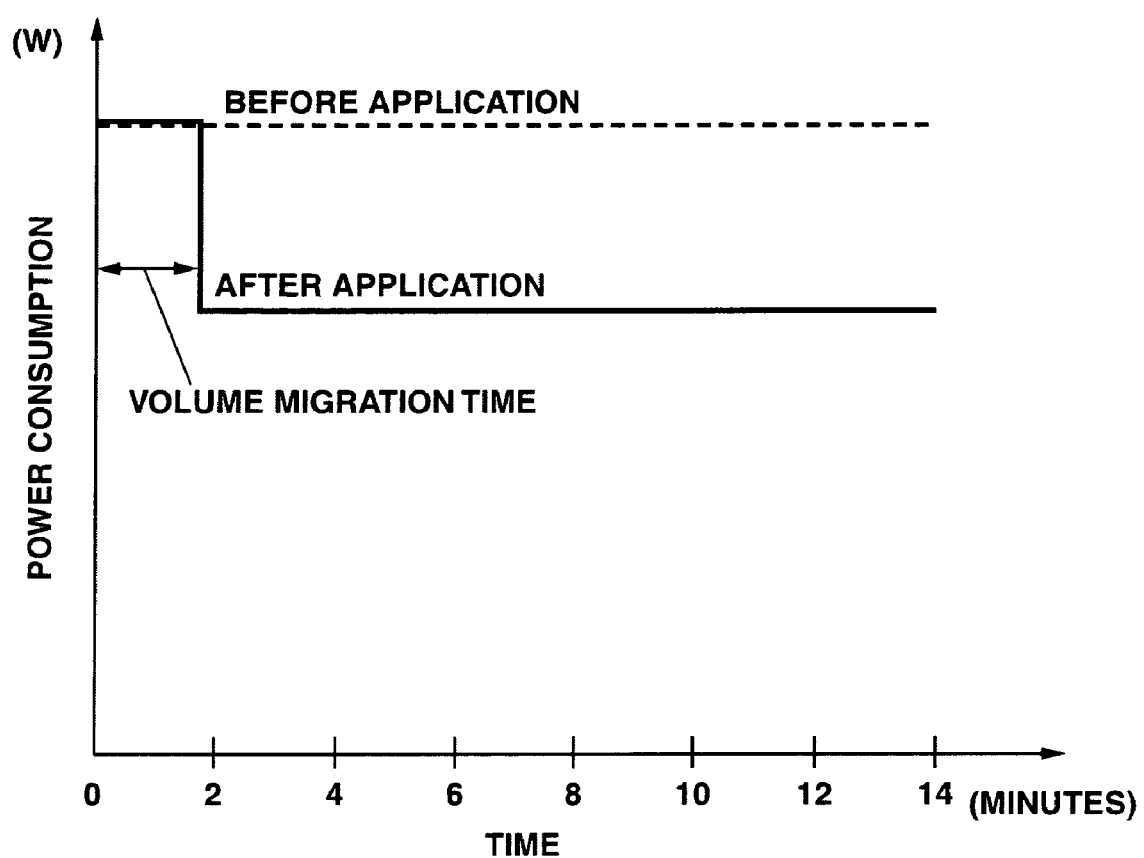
FIG. 25 is a flowchart explaining the execution result of power supply control command processing.

FIG. 25 shows the total power consumption of all storage apparatuses 200 with the horizontal axis representing the time and the vertical axis representing the power consumption. When referring to the total power consumption of all storage apparatuses 200 shown in FIG. 25, since the main power supply 209 of the storage apparatus 200 having the storage apparatus ID "ST3" is turned off after the lapse of the migration time required to migrate the volume 223 having the global volume ID "GVOL0004" to the storage apparatus 200 having the storage apparatus ID "ST2", by executing the foregoing power supply control command processing, it is possible to confirm that the total power consumption of all storage apparatuses 200 will decrease.

As described above, with the computer system 1, the management computer 500 refers to the acquired volume operation schedule management information 522, gives a command to migrate the volume 223 to a storage apparatus 200 with a smaller energy consumption efficiency value at a time when the volume 223 is not being accessed, gives a command to turn off the main power supply 209 of the storage apparatus 200 that will not be accessed, and migrates the corresponding volume 223 in the storage apparatus 200.

Accordingly, with the computer system 1, since it is possible to effectively and validly prevent power consumption in cases of repeatedly turning on and turning off the power supply in short intervals due to the accidental increase or decrease in the access frequency, and extra power consumption required to operate components and the main power supply other than the components required in accessing the volume, it is possible to reduce the power consumption arising from accessing the volume, and reduce the power consumption of the overall computer system.

(2) Second Embodiment

According to the first embodiment, the computer system configured from a plurality of storage apparatuses 200 referred to the volume operation schedule management information 522 so as to migrate the volume 223 to a storage apparatus 200 with a smaller energy consumption efficiency value at a time when the volume 223 is not being accessed in order to reduce the power consumption arising from accessing the volume, and turned off the main power supply 209 of the storage apparatus 200 that will not be accessed in order to reduce the power consumption of the overall computer system 1.

The second embodiment explains the power supply control of a management computer 900 in a computer system 2 having a storage controller 800 with a function of providing the volume 223 of another storage apparatus 200 as its own volume 223 to the host computer 100.

(2-1) Configuration of Computer System 2 in Second Embodiment

Foremost, the configuration of the computer system 2 in the second embodiment is explained. In the second embodiment, the differences with the first embodiment are explained. In the first embodiment, the volume migration computer 700 in the storage network 400 executed the migration of the volume 223 between the storage apparatuses 200, whereas in the second embodiment, the storage controller 800 performs the volume migration between different storage apparatuses 200. The storage controller 800 realizes this volume migration online by processing the I/O access from the host computer, which is currently operating the volume migration of the storage apparatus 200, with the cache memory 806.

For the convenience of ensuing explanations, the volume 223 of the storage apparatus 200 to become the substance of the virtual volume is referred to as a real volume 223. Further, since the configuration of the storage apparatus 200 and the host computer 100 in the second embodiment is the same as in the first embodiment, the detailed explanation of such configuration is omitted.

(2-1-1) Configuration of Computer System 2

Figure 26:
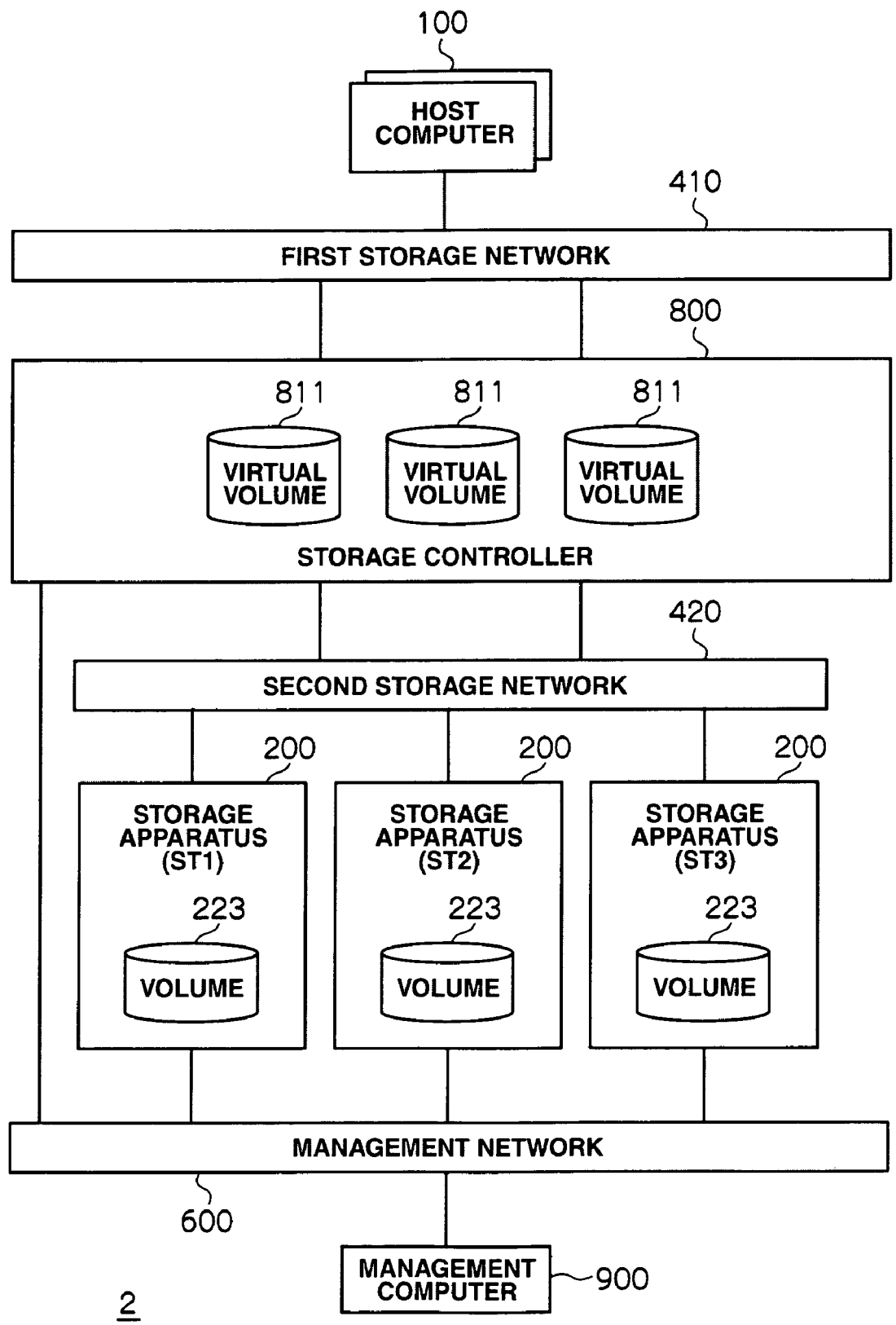
FIG. 26 is a block diagram showing a schematic configuration of a computer system according to another embodiment of the present invention.

FIG. 26 shows the configuration of the computer system 2. One or more host computer 100 and one or more storage controllers 800 using one or more virtual volume 811 are connected via a first storage network 410. Further, the storage controllers 800 and one or more storage apparatuses 200 are connected via a second storage network 420. Moreover, the storage controllers 800 and the storage apparatuses 200 are connected to the management computer 900 via a management network 600.

The virtual volume function of the storage controller 800 is now explained. In recent years, as technology for alleviating the burden on administrators for allocating volumes, for instance, there is technology disclosed in the specification of EP Application No. 2351375. According to EP Application No. 2351375, an apparatus referred to as a storage server possesses the following three functions. In EP Application No. 2351375, the storage server has a function of detecting the volume of the respective storage systems and managing such volume as its own unallocated storage extent as the first function, has a function of creating a virtual volume (hereinafter referred to as a virtual volume) in the storage server based on one or more volumes in the unallocated storage extent and allocating the virtual volume to the host computer as the second function, and has a function of sequentially converting the data access from the host computer to the virtual volume into an address of an actual volume configuring the virtual volume and relaying such data access so as to reply to the data access from the host computer as the third function. By using an apparatus equipped with this kind of virtual volume function, a host computer user or a general storage administrator has to allocate the volumes merely by focusing on the apparatus equipped with the virtual volume function, and the burden on the administrator required to allocate volumes can be alleviated.

In the second embodiment, although the first storage network 410 and the second storage network 420 are separated, these may actually be the same storage network. Nevertheless, the host computer 100 can use the volume 223 of the storage apparatus 200 only by going through the virtual volume 811 of the associated storage controller 800.

For the convenience of ensuing explanations, in the second embodiment, let it be assumed that the host computer 100 of the allocation target host computers "H1", "H2", "H3" and "H4" (described later) is connected to the storage controller 800 via the first storage network 410. Further, let it be assumed that the storage controller 800 of the storage controller ID "SC1" is connected to the storage apparatus 200. Here, let it be assumed that the first storage network 410 and the second storage network 420 are networks using the FC protocol, and the management network 600 is a network using the IP protocol. Moreover, the storage administrator uses the management computer 900 to manage the storage controller 800 and the storage apparatus 200, and the host administrator manages the operation of business using the host computer 100.

(2-1-2) Configuration of Storage Controller 800

Figure 27:
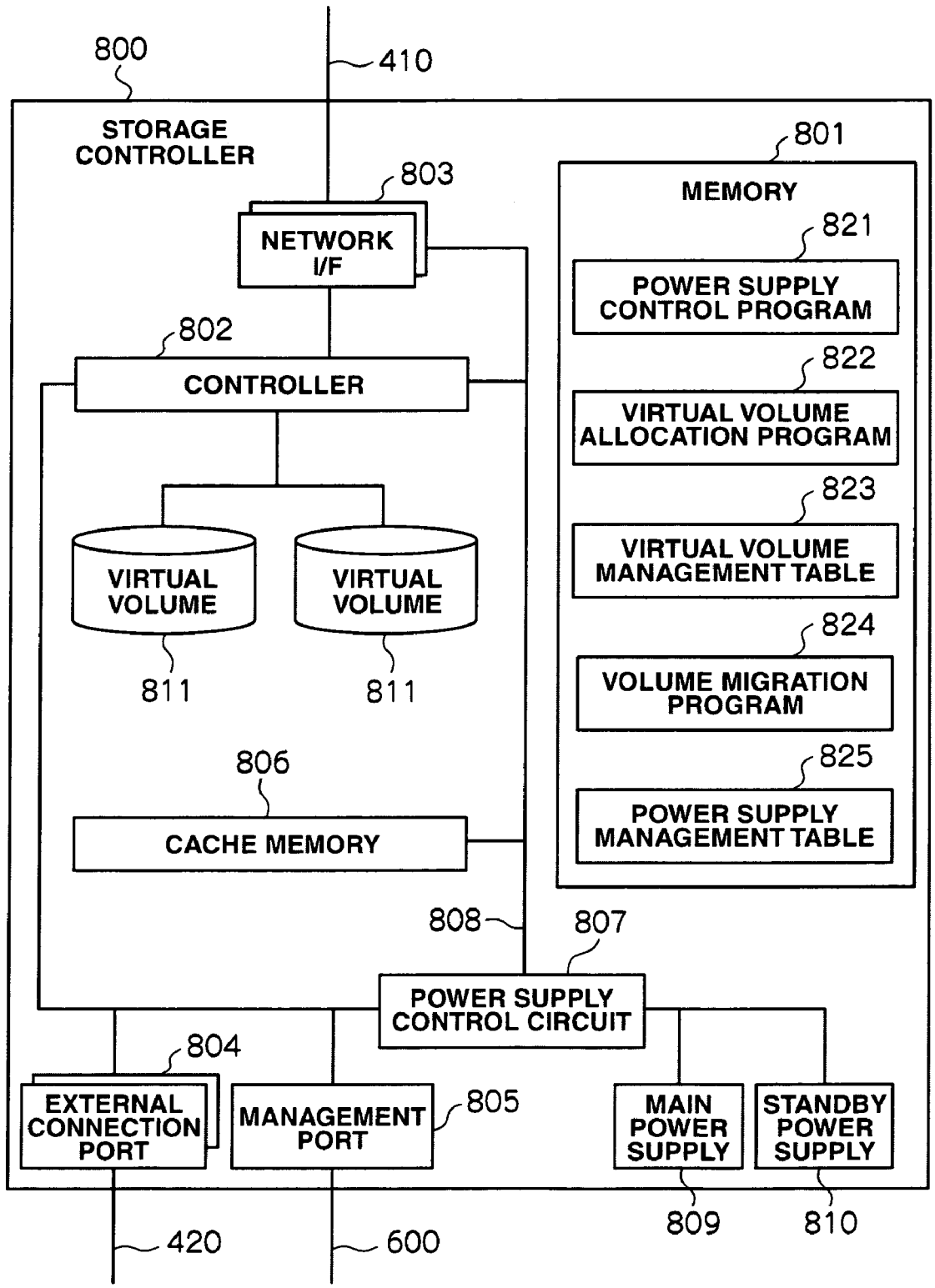
FIG. 27 is a block diagram showing a schematic configuration of a storage controller.

FIG. 27 shows an example of a detailed configuration of the storage controller 800. The storage controller 800 comprises a memory 801 for retaining programs and management information stored in the storage controller 800, a controller 802 for controlling components in the storage controller 800 by executing programs in the memory 201, one or more network I/Fs 803 for connecting to the first storage network 410, one or more external connection ports 804 for connecting to the second storage network 420, a management port 805 for connecting to the management network 600, a cache memory 806 for temporarily processing the I/O access from the host computer 100, and a power supply control circuit 807 for controlling the power supply of components in the storage controller 800, and these components are mutually connected via an internal bus 808.

The storage controller 800 further comprises a main power supply 809 for supplying power to components in the storage controller 800, and a standby power supply 810 for supplying power to the controller 802 and the memory 801 required in executing programs in the memory 801 when the main power supply 809 is turned off, and these components are connected to the power supply control circuit 807.

Further, the storage controller 800 is set with one or more virtual volumes 811 which incorporated the real volume 223 of the storage apparatus 200 via the external connection port 803.

The memory 801 stores a power supply control program 821 for executing the power supply control request in the storage controller 800 issued from the management computer 900, a virtual volume allocation program 822 for executing the creation/deletion request of a virtual volume 811 and the allocation request to the host computer 100 of the logical storage extent issued from the management computer 900, a virtual volume management table 823 for retaining the connection relationship of the virtual volume 811 and the real volume 223 of the storage apparatus 200 and allocation to the host computer 100, a volume migration program 824 for migrating the real volume 223 of the storage apparatus 200 to another storage apparatus 200, and a power supply management table 825 for retaining the power supply status of components in the storage controller 800. These programs and tables are loaded from a storage medium (not shown) such as a hard disk upon booting the storage controller 800. The controller 802 performs various processes by executing these programs and referring to these tables and management information.

(2-1-3) Configuration of Management Computer 900

Figure 28:
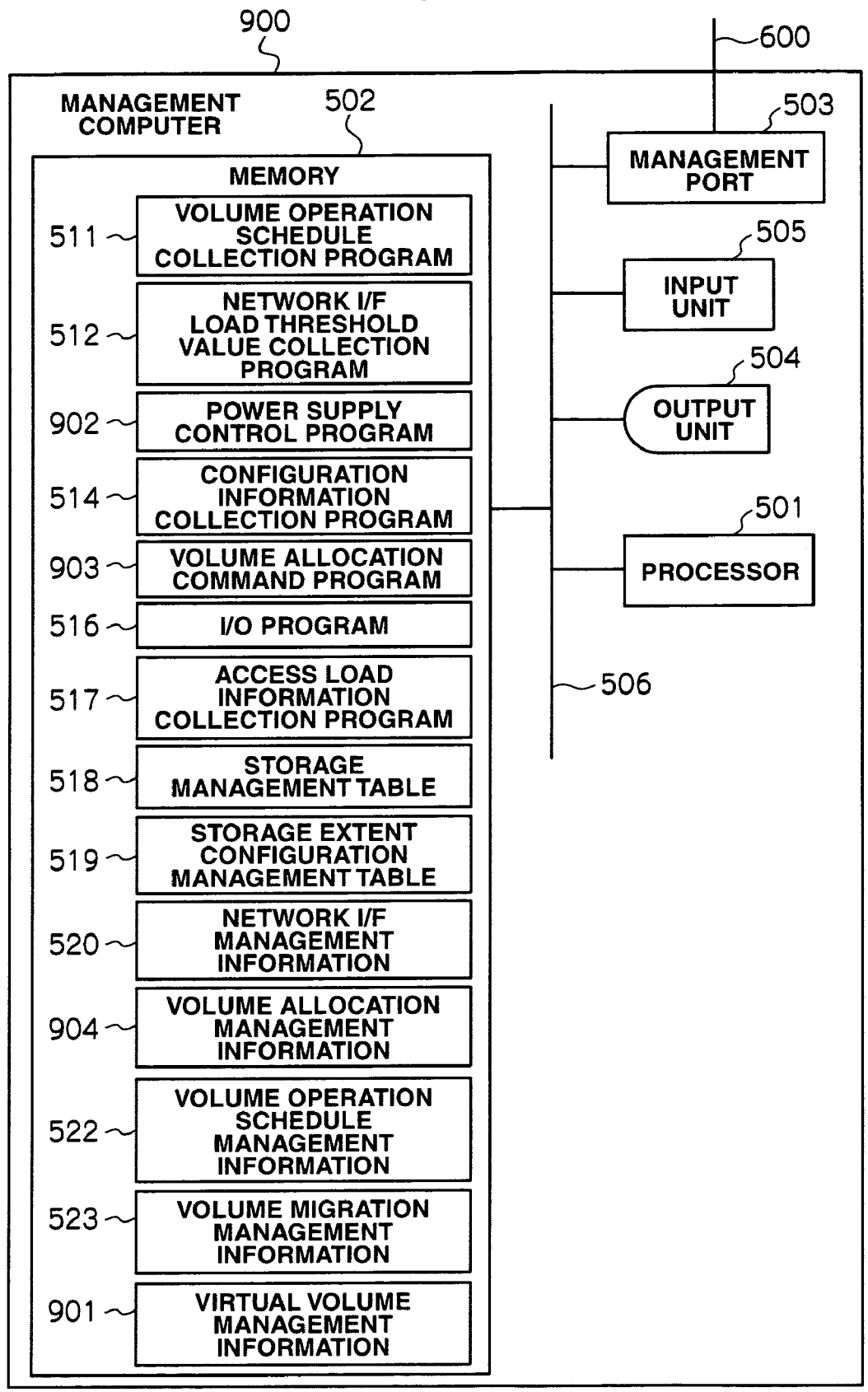
FIG. 28 is a block diagram showing a schematic configuration of a management computer according to another embodiment of the present invention.

FIG. 28 shows a detailed configuration example of the management computer 900. The difference between the management computer 900 of the second embodiment and the management computer 500 of the first embodiment is that the memory 502 in the management computer 900 is newly provided with virtual volume management information 901, processing of the power supply control command program 902 and the volume allocation command program 903 in the memory 502 are subject to different processing from the power supply control command program 513 and the volume allocation command program 515 of the first embodiment, and a storage controller ID field 904C and a controller internal virtual volume ID field 904D of the volume allocation management information 904 are provided in substitute for the storage apparatus ID field 521C and the apparatus internal volume ID field 521D of the volume allocation management information 521.

(2-2) Management Information Stored in Respective Apparatuses of Second Embodiment FIG. 29 to FIG. 31 show the management information handled in the second embodiment.

(2-2-1) Management Information Stored in Storage Controller 800

FIG. 29 and FIG. 30 show examples of the management information stored in the storage controller 800.

(2-2-1-1) Virtual Volume Management Table

FIG. 29 shows an example of the virtual volume management table 823 illustrating the configuration of a virtual volume in the storage controller 800. The virtual volume management table 823 is configured from a virtual volume ID field 823A that registers a virtual volume ID which can be uniquely identified in the storage controller 800, a capacity field 823B that registers the capacity of the virtual volume 811, an allocation target field 823C that registers the allocation target host computer 24 of the virtual volume 811, a controller ID field 823D that registers a controller ID that can be uniquely identified in the storage controller 800 of the controller 802 to which the virtual volume 811 belongs, an external connection port field 823E that registers an external connection port ID for uniquely identifying the external connection port 804 to which the real volume 223 of the virtual volume 811 is allocated, a real storage information field 823F that registers information of the storage apparatus 200 having the real volume 223 of the virtual volume 811.

Here, the real storage information field 823F is configured from a storage apparatus ID field 823G that registers the storage apparatus ID of the storage apparatus 200 having the real volume 223 of the virtual volume 811, and an apparatus internal volume ID field 823H that registers the volume ID capable of uniquely identifying the real volume 223 in the storage apparatus 200.

(2-2-1-2) Power Supply Management Table 825

FIG. 30 shows an example of the power supply management table 825 for managing the power supply status of components in the storage apparatus 200 of the storage controller 800. The power supply management table 825 is configured from a component ID field 825A that registers a component ID in which the component of the storage apparatus 200 can be uniquely identified with the storage controller 800, and a power supply status field 825B that registers the power supply status. The power supply management table 825 is updated with the power supply control program 821 in the storage controller 800.

(2-3) Management Information Stored in Management Computer 900

An example of the virtual volume management information 901 not included in the first embodiment is now explained.

(2-2-1) Virtual Volume Management Information 901

FIG. 31 is an example of the virtual volume management information 901 for managing the configuration of the virtual volume 811 in the storage controller 800. The virtual volume management information 901 is configured from a storage controller ID field 901A that registers the storage controller ID for the management computer 900 to uniquely identify the storage controller 800 with the computer system 2, a virtual volume ID field 901B that registers the virtual volume ID for uniquely identifying the virtual volume 811 in the storage controller 800, and a real storage information field 901C that registers information of the storage apparatus 200 having the real volume 223 of the virtual volume 811. Here, the real storage information field 901C is configured from a storage apparatus ID field 901D that registers the storage apparatus ID for the management computer 900 to uniquely identify the storage apparatus 200 storing the real volume 223 of the virtual volume 811 in the computer system 2, and an apparatus internal volume ID field 901E that registers the volume ID of the real volume 223 in the storage apparatus 200.

(2-4) Detailed Explanation of Program Flowchart in Second Embodiment (2-3-1) Programs Stored in Storage Controller 800

The flow of the virtual volume allocation program 822, the power supply control program 821 and the volume migration program 824, which are programs to be executed by the storage controller 800 in the second embodiment, is now explained.

(2-3-1-1) Virtual Volume Allocation Program 822

The virtual volume allocation program 822 is a program for associating the real volume 223 of the storage apparatus, which is connected to the external connection port 804 via the second storage network 420, to the virtual volume 811 in the storage controller 800 and releasing such association, allocating the virtual volume 811 to the commanded host computer 100 and releasing such allocation, and changing the real volume 223 of the existing virtual volume 811 to another real volume 223 based on a command from the management computer 900, and is executed by the controller 802 in the storage controller 800.

Specifically, upon receiving a creation request of the virtual volume 811 from the management computer 900, the virtual volume allocation program 822 newly registers the virtual volume ID in the virtual volume management table 823, registers the commanded real volume 223 in the real storage information field 823F of the newly registered virtual volume ID, and registers the controller ID of the controller 802 to be used, the external connection port ID of the external connection port 804 and the capacity of the real volume 223 in the corresponding field.

Further, when the virtual volume allocation program 822 receives an allocation request from the management computer 900 for allocating the virtual volume 811 to the host computer 100, it registers the commanded host computer 100 in the allocation target field 823C of the commanded virtual volume ID of the virtual volume management table 823. Moreover, when the virtual volume allocation program 822 receives a command from the management computer 900 for changing the real volume 223, it changes the real storage information field 823F of the virtual volume management table 823 to the designated real volume 223.

(2-3-1-2) Power Supply Control Program 821

The power supply control program 821 is executed by the controller 802 by the storage controller 800 receiving the power supply control request sent from the management computer 900 via the management network 600. Specifically, when the storage controller 800 receives the power supply control request, the power supply control program 821 sends a control signal to the power supply control circuit 807 for changing the power supply of the component indicated in the power supply control request to the designated status. Thereafter, the power supply control program 821 rewrites the power supply status field 825B in the power supply management table 825 of the component designated in the power supply control request to the status designated in the request.

Further, when a data access request to the virtual volume 811 is sent from the host computer 100 or another storage controller 800, the power supply control program 821 sends a control signal to the power supply control circuit 807 for turning on the main power supply 809 when the main power supply 809 is turned off, and sends a control signal to the power supply control circuit 807 for turning on the power supply of the external connection port 804 related to the corresponding virtual volume 811. Based on this processing, the power supply status field 825B in the power supply management table 825 of the component, in which the power supply status has been changed, is rewritten as the status after the transmission of the control signal.

(2-3-1-3) Volume Migration Program 824

The volume migration program 824 is a program for copying the data of the migration source real volume 223 to the migration target real volume 223, or swapping the data of the migration source real volume 223 and the data of the migration target real volume 223 based on the command from the management computer 900, and is executed by the controller 802.

Specifically, when the volume migration program 824 is commanded to copy the data of the migration source real volume 223 to the migration target real volume 223, it copies all blocks from the first block to the last block of the migration source real volume 223 to the migration target real volume 223.

Further, when the volume migration program 824 is commanded to swap the data of the migration source real volume 223 and the data of the migration target real volume 223, it exchanges the blocks of the migration source real volume 223 and the migration target real volume 223 in order from the first block.

Moreover, when the volume migration program 824 is commanded to copy the difference of the data of the migration source real volume 223 and the data of the migration target real volume 223, it compares the migration source real volume 223 and the migration target real volume 223 in order from the top block, and, when the contents differ, it copies the relevant block of the migration source real volume 223 to the corresponding block of the migration target real volume 223.

Incidentally, the I/O access from the host computer 100 during volume migration is accumulated in the cache memory 806 in the storage controller 800, and, after the completion of copying, the I/O accumulated in the cache memory 806 is reflected in the migration target real volume 223.

(2-3-2) Programs Stored in Management Computer 900

The flow of programs to be executed by the management computer 900 in the second embodiment is now explained. In the second embodiment, the volume allocation command program 903 and the power supply control command program 902 having different flows than the first embodiment are explained.

(2-3-2-1) Volume Allocation Command Program 903

Figure 32:
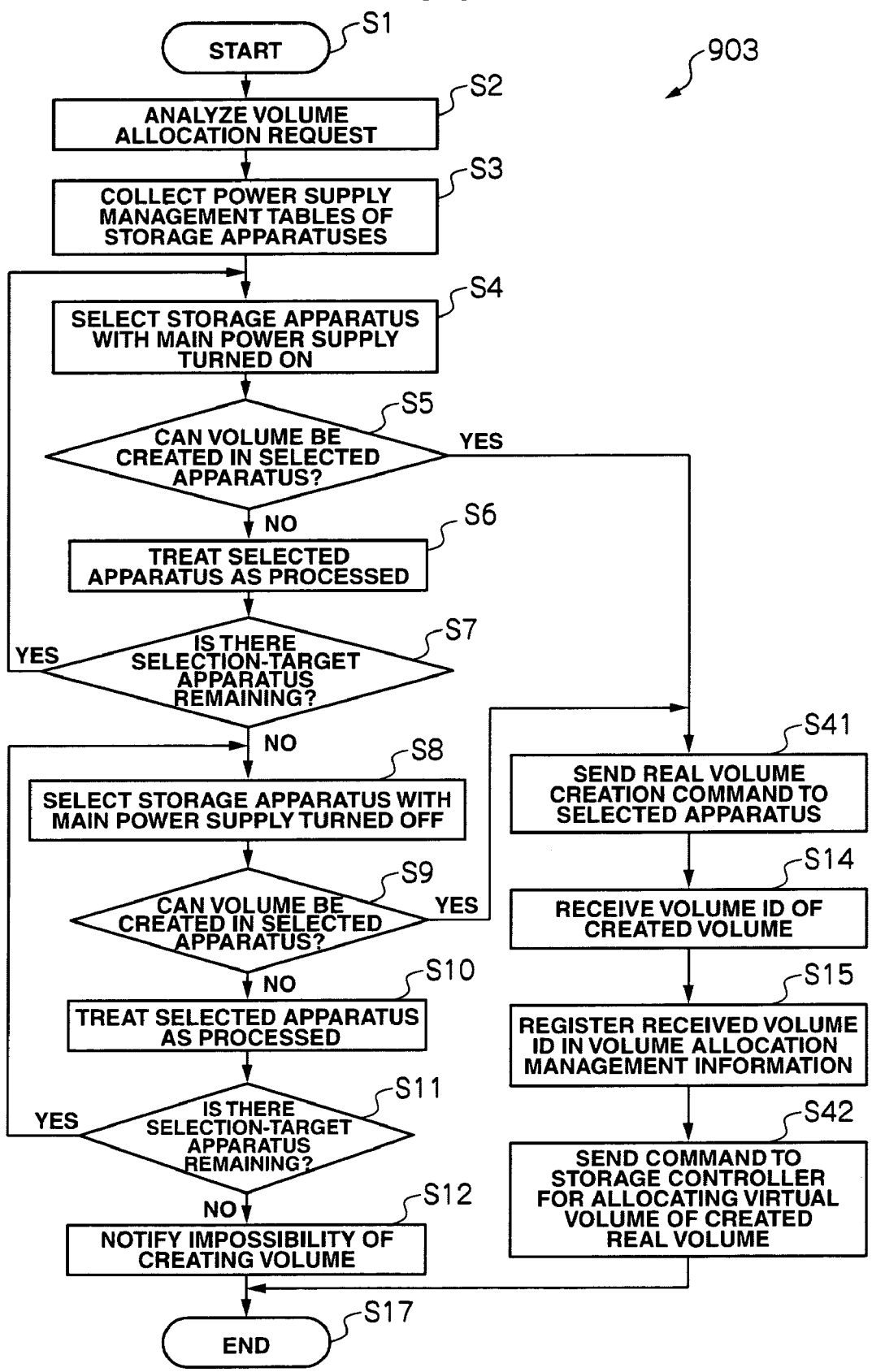
FIG. 32 is a flowchart explaining a volume allocation command processing routine according to another embodiment of the present invention.

FIG. 32 shows a flowchart of the volume allocation command program 903 in the second embodiment. The volume allocation command program 903 in the second embodiment and the volume allocation command program 515 in the first embodiment perform the same processing other than that the allocation routine of the real volume 223 to the host computer 100 is different.

Specifically, the volume allocation command program 903 sends a volume creation command to the selected storage apparatus 200 and an allocation command to the requested host computer 100 (step S13), and notifies the success of volume allocation to the requesting host computer 100 or the storage apparatus 200 (step S16). Whereas the volume allocation command program 903 sends a creation command of the real volume 223 to the selected storage apparatus 200 (step S41), creates the virtual volume 811 of the created real volume 223, and sends an allocation command to the storage controller 800 for allocating the virtual volume 811 to the host computer 100 (step S42).

(2-3-2-2) Power Supply Control Command Program 902

Figure 33:
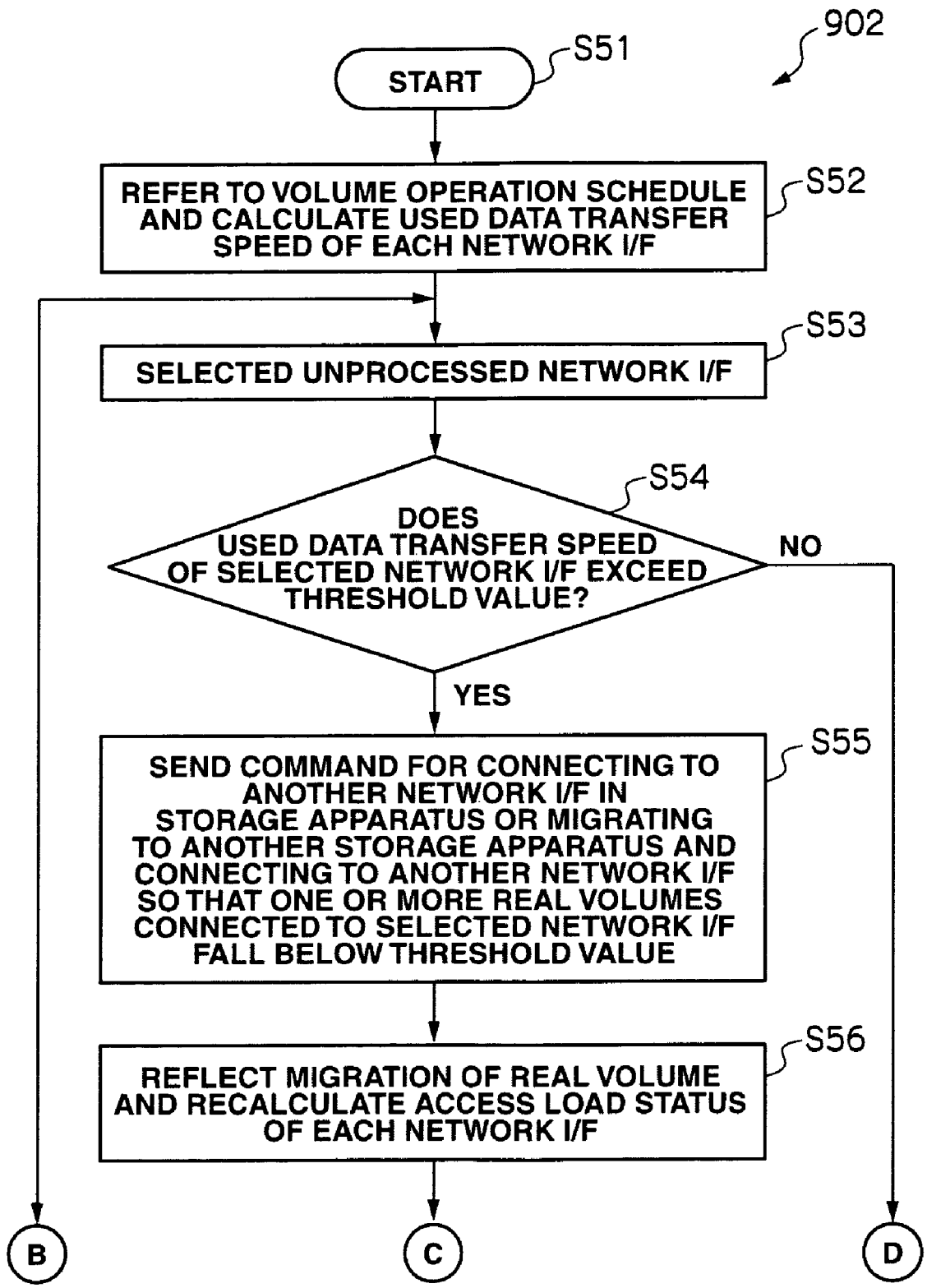
FIG. 33 is a flowchart explaining a power supply control command processing routine according to another embodiment of the present invention.
Figure 34:
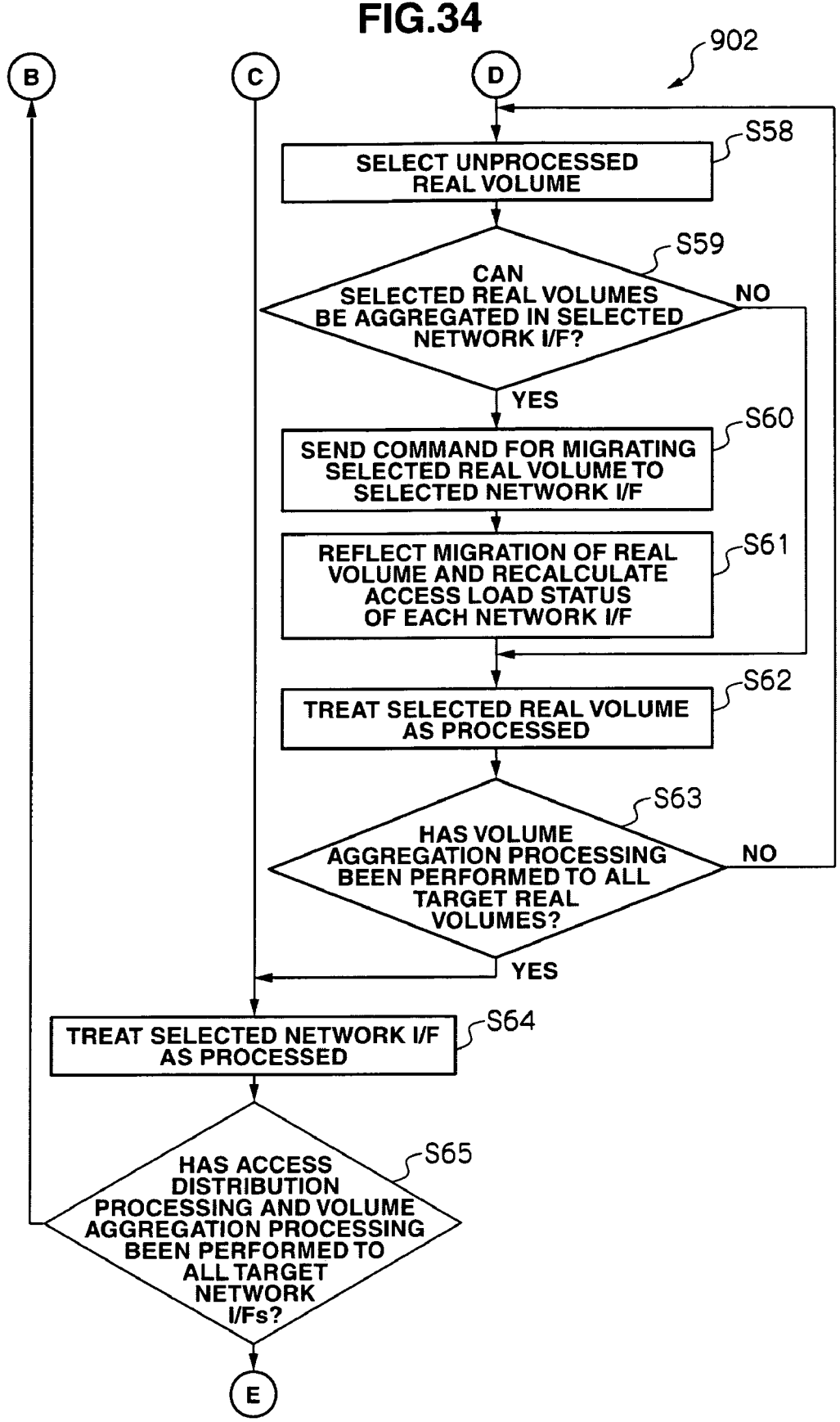
FIG. 34 is a flowchart explaining a power supply control command processing routine according to another embodiment of the present invention.
Figure 35:
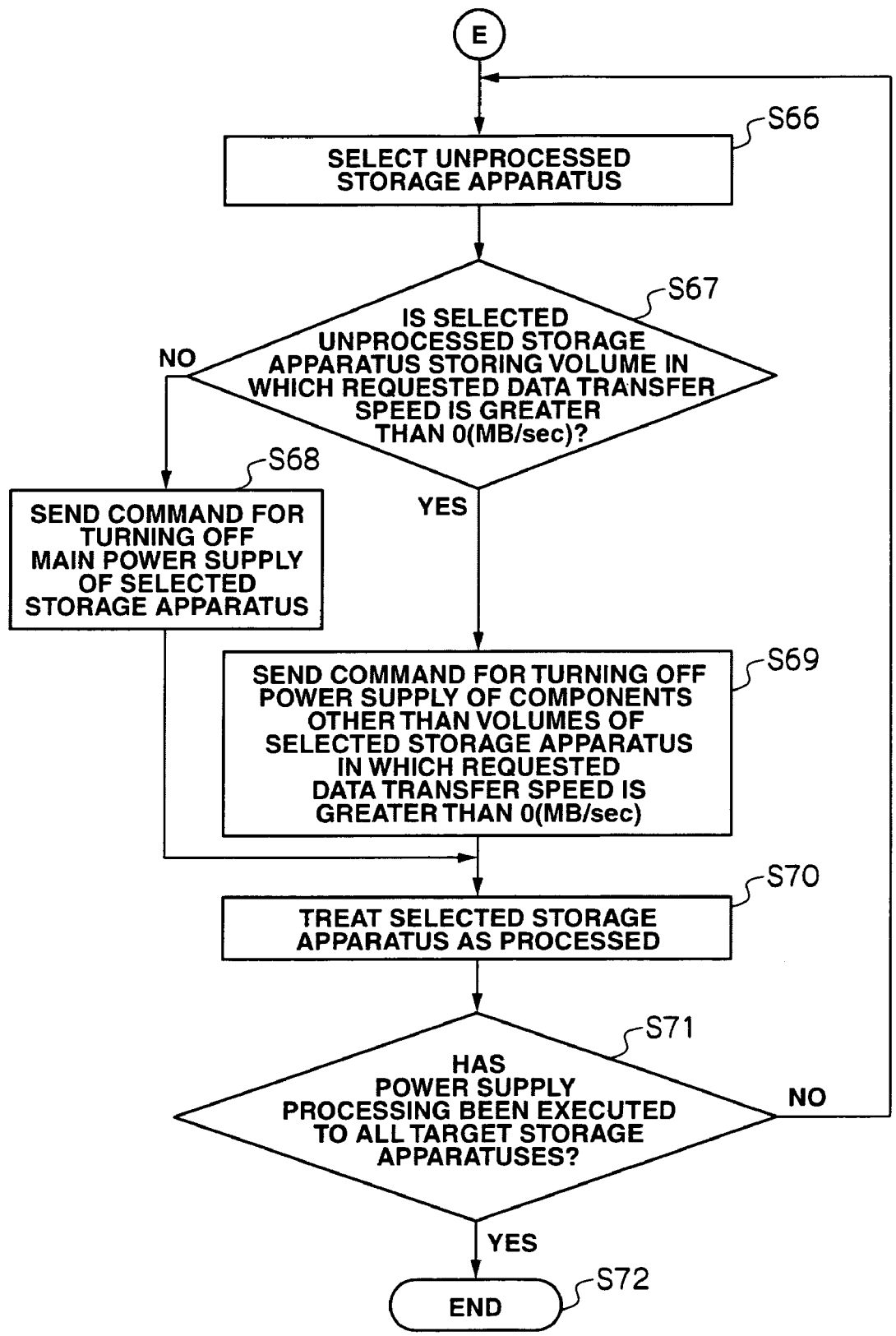
FIG. 35 is a flowchart explaining a power supply control command processing routine according to another embodiment of the present invention.

FIG. 33 to FIG. 35 show flowcharts of the power supply control command program 902 in the second embodiment.

FIG. 33 shows a flowchart of the access distribution processing of the power supply control command program 902. When the power supply control command program 902 receives a command at a prescribed timing or based on operations of the input unit 505 by the storage administrator, it starts the power supply control command processing (step S51), and calculates the used data transfer speed of the network I/F 203 in the storage apparatus 200 based on the volume operation schedule management information 522 and the storage extent configuration management information 519 (step S52). Here, a used data transfer speed is the total speed of the requested data transfer speeds of the real volumes 223 connected to the network I/F 203.

Figure 36:
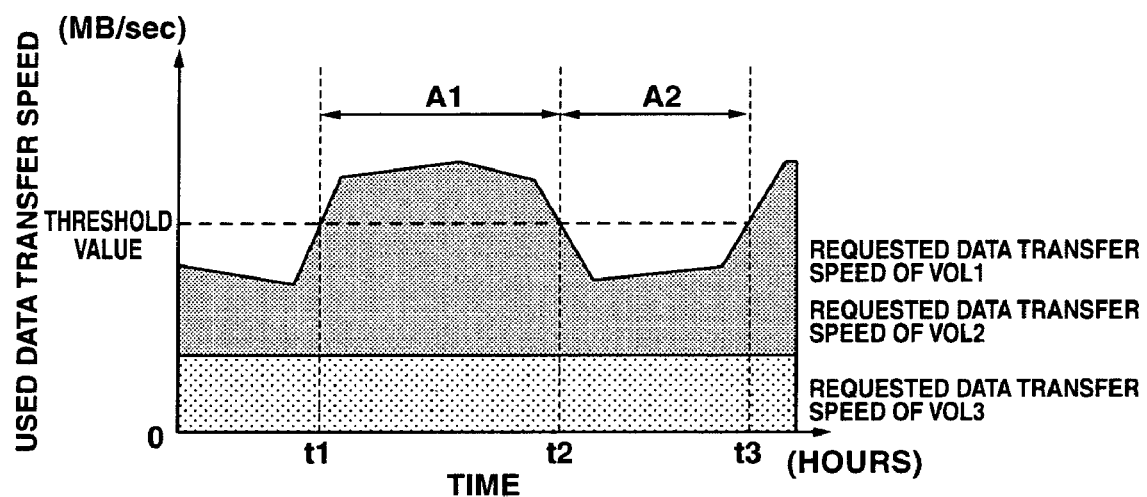
FIG. 36 is a conceptual diagram explaining the used data transfer speed of a network I/F calculated based on the power supply command processing according to another embodiment of the present invention.

Here, FIG. 36 shows an example of the used data transfer speed of the network I/F 203 with the horizontal axis representing the time and the vertical axis representing the used data transfer speed. The network I/F 203 shown in FIG. 36, for instance, is connected to three real volumes 223 (VOL1, VOL2, VOL3).

The power supply control command program 902 in the second embodiment refers to the used data transfer speed of the network I/F 203 calculated at step S52 and the threshold value of the network I/F management information 520, and, when the used data transfer speed exceeds the threshold value (t1 (time) in FIG. 36), performs processing of connecting the real volume 223 (any one of VOL1, VOL2, VOL3 shown in FIG. 36), which is connected to the network I/F 203, to another network I/F 203 in the storage apparatus 200, or migrates the real volume 223 to another storage apparatus 200 and connects it to another network I/F 203 so as to balance the access load of the network I/F 203 (access distribution processing), and, when the used data transfer speed is below the threshold value (t2 (time) shown in FIG. 36), it performs (real volume aggregation processing) of connecting the real volume 223 to another network I/F 203 and aggregating the real volumes 223 subject to an access load in the network I/F 203 (real volume aggregation processing). Further, the power supply control command program 902 performs processing of sending a command for turning off the main power supply of the storage apparatus 200 that does not store the real volume 223 subject to an access load (power supply control command processing).

Here, the power supply control command program 902 selects an unprocessed network I/F 203 among all network I/Fs 203 in the computer system 2 (step S53).

Subsequently, the power supply control command program 902 determines that the used data transfer speed of the selected network I/F 203 exceeds the threshold value (step S54). Here, when the power supply control command program 902 determines that the used data transfer speed exceeds the threshold value (step S54: YES), it performs the access distribution processing at step S55 and step S56.

In other words, the power supply control command program 902 sends a command to connect the real volume 223 connected the network I/F 203 to the virtual volume 811 via another network I/F 203 in the storage apparatus 200, or to migrate the real volume 223 to another storage apparatus 200 and connect it to the virtual volume 811 via the network I/F 203 of another storage apparatus 200 so that the used data transfer speed of the selected network I/F 203 falls below the threshold value (step S56), and thereby balances the access load on the selected network I/F 203.

Here, the migration target network I/F 203 is a network I/F 203 in which the access load of the migration target network I/F 203 does not exceed the threshold value during the data migration of the real volume 223.

Incidentally, in order to reduce the power consumption during the access load balancing operation, the power supply control command program 902 may preferentially connect the real volume 223, which is connected to the selected network I/F 203, to another network I/F 203 in the storage apparatus 200, and refrain from migrating the real volume 223 to another storage apparatus 200.

Further, upon migrating the real volume 223 to another storage apparatus 200, the power supply control command program 902 may preferentially make the real volume 223 having a short migration time (=capacity (MB)/data transfer speed (MB/sec)) as the migration target. Moreover, upon migrating the real volume 223 to a different storage apparatus 200, the power supply control command program 902 may preferentially select a migration target storage apparatus 200 having a small energy consumption efficiency value. In addition, when the migration time of the real volume to be connected to the selected network I/F 203 exceeds the threshold value (A1 (time) shown in FIG. 36), the power supply control command program 902 sends a command to the storage controller 800 to stop the migration of the real volume 223, and perform processing for accessing the data with the cache memory 806 of the storage controller 800.

Subsequently, the power supply control command program 902 recalculates the used data transfer speed of the selected network I/F 203 and the migration target network I/F 203 after the migration of the real volume 223 (step S57).

Contrarily, when the used data transfer speed does not exceed (falls below) the threshold value (step S54: NO), the power supply control command program 902 performs the volume aggregation processing at step S58 to step S63.

FIG. 34 shows a flowchart of the volume aggregation processing of the power supply control command program 902. The power supply control command program 902 selects an unprocessed real volume 223 stored in the storage apparatus 200 other than the storage apparatus 200 having the selected network I/F 203 (step S58).

Subsequently, the power supply control command program 902 determines whether the selected real volumes 223 can be aggregated in the selected network I/F 200 (step S59).

Specifically, the power supply control command program 902 determines that aggregation is possible when the migration time of the selected real volume 223 is shorter than the time (A1 (time) shown in FIG. 36) required for the access load of the selected network I/F 203 to exceed the subsequent threshold value, and there is sufficient unused capacity for storing the selected real volume 223.

Here, when the power supply control command program 902 determines that the selected real volume 223 can be aggregated in the selected network I/F 200 (step S59: YES), it sends a command to migrate the selected real volume 223 to the storage apparatus 200, and connect the real volume 223 to the selected network I/F 203 at step S53 (step S60), and recalculates the used data transfer speed of the migration target and the migration source network I/F 203 (step S61). Here, upon selected the real volume 223 to be aggregated, the power supply control command program 902 may preferentially select a real volume 223 of the storage apparatus 200 with a large energy consumption efficiency value from the storage apparatus 200 having the selected network I/F 203.

Contrarily, the power supply control command program 902 proceeds to step S62 when it determines that the selected real volume 223 cannot be aggregated in the selected network I/F 200 (aggregation is impossible) (step S59: NO).

Eventually, the power supply control command program 902 treats the selected real volume 223 as processed (step S62).

Subsequently, the power supply control command program 902 determines whether the volume aggregation processing has been executed to all real volumes 223 to be subject to such volume aggregation processing (step S63). Here, the power supply control command program 902 returns to step S58 when it determines that the volume aggregation processing has not been executed to all real volumes 223 to be subject to the volume aggregation processing (step S63: NO).

Eventually, when the power supply control command program 902 determines that the volume aggregation processing has been performed to all real volumes 223 to be subject to the volume aggregation processing (step S63: YES), or recalculates the used data transfer speed of the selected network I/F 203 and the migration target network I/F 203 after the migration of the real volume 223 (step S57) it treats the selected network I/F 203 as selected (step S64).

The power supply control command program 902 thereafter determines whether the access distribution processing or the volume aggregation processing has been executed to all network I/Fs 203 to be subject to the access distribution processing or the volume aggregation processing (step S65). Here, the power supply control command program 902 returns to step S53 when it determines that the access distribution processing or the volume aggregation processing has not been performed to all network I/Fs 203 to be subject to the access distribution processing or the volume aggregation processing (step S65: NO). Contrarily, when the power supply control command program 902 determines that the access distribution processing or the volume aggregation processing has been performed to all network I/Fs 203 to be subject to the access distribution processing or the volume aggregation processing (step S65: YES), it thereafter ends the access distribution processing and the volume aggregation processing, and executes power supply control command processing.

FIG. 35 shows a flowchart of the power supply control command processing of the power supply control command program 902. The power supply control command program 902 executes the same processing as step S30 to step S36 in the first embodiment (step S66 to step S72).

Figure 39:
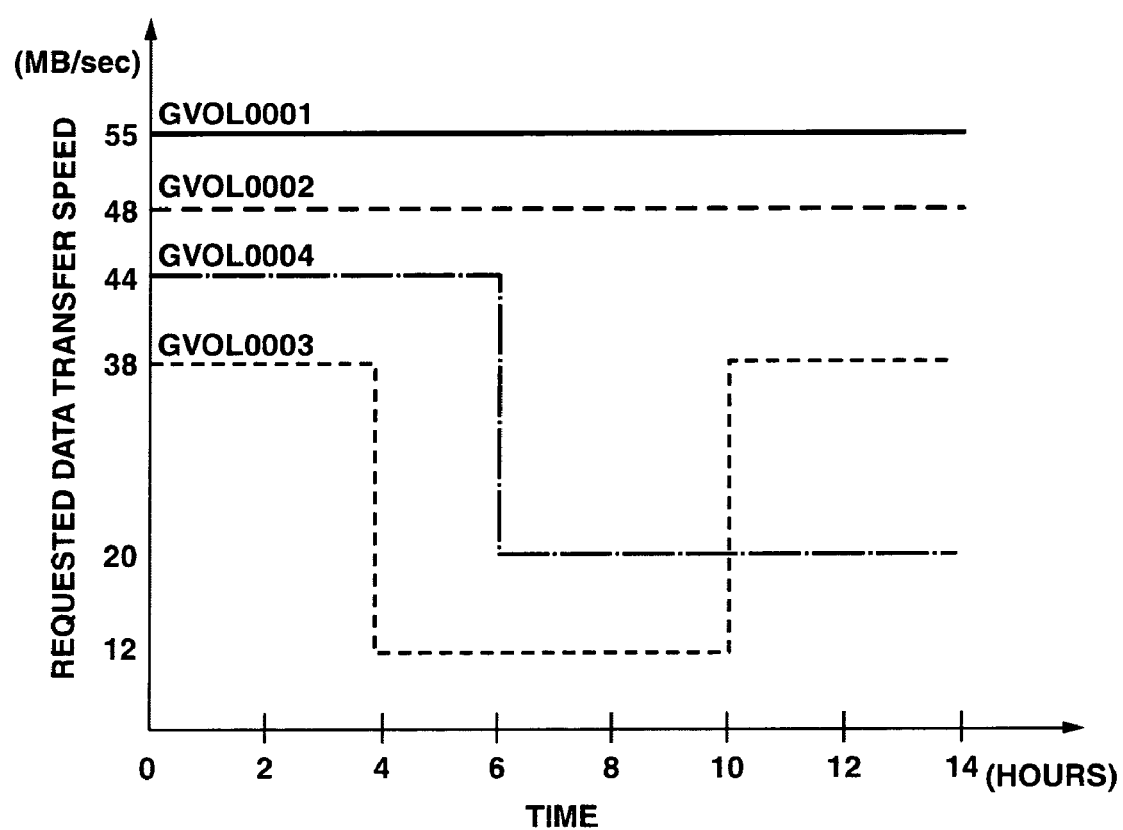
FIG. 39 is a conceptual diagram explaining the execution process of power supply control command processing according to another embodiment of the present invention.

(2-3) Explanation of Specific Power Supply Control Command Program 902 of Second Embodiment A specific example of the power supply control command program 902 in the second embodiment is now explained. For instance, a specific example of the power supply control command program 902 would be a case where the storage extent configuration management information 519 of the management computer 900 is shown in FIG. 37, the initial status of the volume allocation management information 904 is shown in FIG. 38, and the volume operation schedule management information per real volume 223 of the global volume ID in which the horizontal axis of the volume operation schedule management information 522 represents the time and the vertical axis represents the requested data transfer speed is shown in FIG. 39. Further, in this specific example, the network I/F management information 520 is shown in FIG. 14, the virtual volume management information 901 is shown in FIG. 30, and the storage apparatus management table 518 is shown in FIG. 12. Moreover, in this specific example, the access load status (from the initial status to 4 hours later) of the respective network I/Fs 203 calculated based on the volume operation schedule management information shown in FIG. 39, the virtual volume management information 901 and the storage extent configuration management information 519 is shown in FIG. 40.

(2-3-1) 4 Hours Later

By referring to the volume operation schedule management information shown in FIG. 39, the power supply control command program 902 confirms that the requested data transfer speed of the real volume 223 having the global volume ID "GVOL0003" changes from 38 (MB/sec) to 12 (MB/sec). Then, by referring to the storage apparatus management table 518 shown in FIG. 12, the power supply control command program 902 selects the network I/F ID 203 having the network I/F ID "Port0" in the storage apparatus 200 having the storage apparatus ID "ST1" with a small energy consumption efficiency value (step S53).

Subsequently, by referring to the access load status shown in FIG. 40, the power supply control command program 902 sends a command for aggregating the real volume 223 from another storage apparatus 200 with a large energy consumption efficiency value so that it does not exceed the threshold value since the access load of the network I/F ID 203 having the network I/F ID "Port0" is 55 (MB/sec), and is below the threshold value of 80 (MB/sec) (step S54: NO) (step S58 to step S63).

In other words, by referring to the storage apparatus management table 518 shown in FIG. 12, the power supply control command program 902 foremost selects the real volume 223 having the global volume ID "GVOL0004" in the storage apparatus 200 having the storage apparatus ID "ST3" with the largest energy consumption efficiency value (step S59). Nevertheless, by referring to the volume operation schedule management information shown in FIG. 39, the power supply control command program 902 confirms that the requested data transfer speed of the real volume 223 having the global volume ID "GVOL0004" is 44 (MB/sec), and confirms that it cannot be aggregated in the network I/F ID 203 having the network I/F ID "Port0" in the storage apparatus 200 having the storage apparatus ID "ST1" (step S59: NO). Then, the power supply control command program 902 treats the real volume 223 having the global volume ID "GVOL0004" as subject to aggregation processing (step S62).

Subsequently, by referring to the storage apparatus management table 518 shown in FIG. 12, the power supply control command program 902 selects the real volume 223 having the global volume ID "GVOL0003" in the storage apparatus 200 having the storage apparatus ID "ST2" with the next largest energy consumption efficiency value (step S58). Here, by referring to the volume operation schedule management information shown in FIG. 39, the power supply control command program 902 confirms that the requested data transfer speed of the read volume 223 having the global volume ID "GVOL0003" is 12 (MB/sec), and, by referring to the volume allocation management information 521 shown in FIG. 15, confirms that the allocation capacity of the real volume 223 having the global volume ID "GVOL0003" is 10 (GB), and confirms that it can be aggregated in the network I/F ID 203 having the network I/F ID "Port0" in the storage apparatus 200 having the storage apparatus ID "ST1" (step S59: YES).

Then, the power supply control command program 902 sends to the storage controller 800 a command to migrate the real volume 223 having the global volume ID "GVOL0003" to the storage apparatus 200 having the storage apparatus ID "ST1" (step S60), recalculates the access load status of the migration source and migration target network I/Fs 203 (step S61), and treats the real volume 223 having the global volume ID "GVOL0003" as subject to aggregation processing (step S62).

Subsequently, by referring to the volume allocation management information 521 shown in FIG. 15, the power supply control command program 902 treats the selected network I/F 203 (network I/F ID 203 having the network I/F ID "Port0" in the storage apparatus 200 having the storage apparatus ID "ST1") as subject to access distribution processing and volume aggregation processing since there is no other real volume 223 to be subject to volume aggregation processing (step S63: NO) (step S64).

By referring to the storage apparatus management table 518 shown in FIG. 12, the power supply control command program 902 thereafter selects the remaining network I/F ID 203 having the network I/F ID "Port1" in the storage apparatus 200 having the storage apparatus ID "ST1" (step S53).

Subsequently, by referring to the access load status shown in FIG. 40, the power supply control command program 902 sends a command to aggregate the real volume 223 from another storage apparatus 200 with a larger energy consumption efficiency value so that it does not exceed the threshold value since the access load of the network I/F ID 203 having the network I/F ID "Port1" is 48 (MB/sec), and is below the threshold value, which is 80 (MB/sec) (step S54: NO) (step S58 to step S63). Nevertheless, by referring to the volume allocation management information 521 shown in FIG. 15, the power supply control command program 902 treats the selected network I/F 203 (network I/F ID 203 having the network I/F ID "Port1" in the storage apparatus 200 having the storage apparatus ID "ST1") as subject to access distribution processing and volume aggregation processing since there is no other real volume 223 to be subject to the volume aggregation processing (step S63: NO) (step S64).

By referring to the storage apparatus management table 518 shown in FIG. 12, the power supply control command program 902 selects the network I/F ID 203 having the network I/F ID "Port0" in the storage apparatus 200 having the storage apparatus ID "ST2" with the next smallest energy consumption efficiency value (step S53).

Subsequently, the power supply control command program 902 sends a command to aggregate the real volume 223 from another storage apparatus 200 with a larger energy consumption efficiency value so that it does not exceed the threshold value since the real volume 223 having the global volume ID "GVOL0003" has been migrated to the storage apparatus 200 having the storage apparatus ID "ST1", and the access load of the network I/F ID 203 having the network I/F ID "Port0" in the storage apparatus 200 having the storage apparatus ID "ST2" is thereby 0 (MB/sec), and below the threshold value, which is 80 (MB/sec) (step S54: NO) (step S58 to step S63).

In other words, by referring to the storage apparatus management table 518 shown in FIG. 12, the power supply control command program 902 foremost selects the real volume 223 having the global volume ID "GVOL0004" in the storage apparatus 200 having the storage apparatus ID "ST3" with the largest energy consumption efficiency value (step S59). Here, by referring to the volume operation schedule management information shown in FIG. 39, the power supply control command program 902 confirms that the requested data transfer speed of the real value 223 having the global volume ID "GVOL0004" is 44 (MB/sec), and, by referring to the volume allocation management information 521 shown in FIG. 15, confirms that the allocation capacity of the real volume 223 having the global volume ID "GVOL0004" is 5 (GB), and confirms that it can be aggregated in the network I/F ID 203 having the network I/F ID "Port0" in the storage apparatus 200 having the storage apparatus ID "ST2" (step S59: YES).

Then, the power supply control command program 902 sends to the storage controller 800 a command to migrate the real volume 223 having the global volume ID "GVOL0004" to the storage apparatus 200 having the storage apparatus ID "ST2" (step S60), recalculates the access load status of the migration source and migration target network I/Fs 203 (step S61), and treats the real volume 223 having the global volume ID "GVOL0004" as subject to aggregation processing (step S62).

Subsequently, by referring to the volume allocation management information 521 shown in FIG. 15, the power supply control command program 902 treats the selected network I/F 203 (network I/F ID 203 having the network I/F ID "Port0" in the storage apparatus 200 having the storage apparatus ID "ST2") as subject to access distribution processing and volume aggregation processing since there is no other real volume 223 that is subject to the volume aggregation processing (step S63: NO) (step S64).

By referring to the storage apparatus management table 518 shown in FIG. 12, the power supply control command program 902 thereafter selects the network I/F IDs "Port0" and "Port1" in the storage apparatus 200 having the storage apparatus ID "ST3" with the next smallest energy consumption efficiency value (step S53).

Nevertheless, since the power supply control command program 902 migrated the real volume 223 having the global volume ID "GVOL0004" to the storage apparatus 200 having the storage apparatus ID "ST2", the real volume 223 is not stored in the storage apparatus 200 having the storage apparatus ID "ST3", and, by referring to the storage apparatus management table 518 shown in FIG. 12, it confirms that there is no other storage apparatus 200 having an energy consumption efficiency value that is greater than or equal to the energy consumption efficiency value of the storage apparatus 200 having the storage apparatus ID "ST3". Accordingly, the power supply control command program 902 treats the selected network I/F 203 (network I/F ID 203 having network I/F IDs "Port0" and "Port1" in the storage apparatus 200 having the storage apparatus ID "ST3") as subject to access distribution processing and volume aggregation processing (step S64).

Subsequently, by referring to the storage apparatus management table 518 shown in FIG. 12, the power supply control command program 902 executes the power supply control command processing at step S66 onward since it has executed the access distribution processing and the volume aggregation processing of all network I/Fs 203 to be subject to such access distribution processing and volume aggregation processing (step S65: YES).

In other words, the power supply control command program 902 selects the storage apparatus 200 having the storage apparatus ID "ST1" that has not yet been subject to power supply control command processing (step S66). The power supply control command program 902 confirms that the storage apparatus 200 having the storage apparatus ID "ST1" that has not yet been subject to power supply control command processing is storing the real volume 223 in which the requested data transfer speed is greater than 0 (MB/sec) (step S67: YES), sends a command to the storage apparatus 200 having the storage apparatus ID "ST1" for turning off the power supply of components unrelated to the real volume 223 (step S69), thereby turns off the power supply of components unrelated to the real volume 223 in the storage apparatus 200 having the storage apparatus ID "ST1", and thereafter treats the storage apparatus 200 having the storage apparatus "ST1" a subject to power supply control command processing (step S70).

Subsequently, the power supply control command program 902 selects the storage apparatus 200 having the storage apparatus ID "ST2" that has not yet been subject to power supply control command processing (step S66). The power supply control command program 902 confirms that the storage apparatus 200 having the storage apparatus ID "ST2" that has not yet been subject to power supply control command processing is storing the real volume 223 in which the requested data transfer speed is greater than 0 (MB/sec) (step S67: YES), sends a command to the storage apparatus 200 having the storage apparatus ID "ST2" for turning off the power supply of components unrelated to the real volume 223 (step S69), turns off the power supply of components unrelated to the real volume 223 in the storage apparatus 200 having the storage apparatus ID "ST2", and thereafter treats the storage apparatus 200 having the storage apparatus ID "ST2" as subject to power supply control command processing (step S70).

Subsequently, the power supply control command program 902 selects the storage apparatus 200 having the storage apparatus ID "ST3" that has not yet been subject to power supply control command processing (step S66). The power supply control command program 902 confirms that the storage apparatus 200 having the storage apparatus ID "ST3" that has not yet been subject to power supply control command processing is not storing the real volume 223 since it migrated the real volume 223 having the global volume ID "GVOL0004" to the storage apparatus 200 having the storage apparatus ID "ST3" (step S67: NO), sends a command to the storage apparatus 200 having the storage apparatus ID "ST3" for turning off the main power supply 209 of storage apparatus 200 having the storage apparatus ID "ST3" (step S69), thereby turns off the main power supply 209 of storage apparatus 200 having the storage apparatus ID "ST3", turns on the standby power supply 210, and thereafter treats the storage apparatus 200 having the storage apparatus ID "ST3" as subject to power supply control command processing (step S70).

Subsequently, by referring to the storage apparatus management table 518 shown in FIG. 12, the power supply control command program 902 ends the power supply control command processing (step S72) since the power supply control command processing has been executed to all storage apparatuses 200 to be subject to such power supply control command processing (step S71: YES).

FIG. 41 shows the access load status of the respective network I/Fs 203 after performing the power supply control command processing. By referring to the volume operation schedule management information shown in FIG. 39, the power supply control command program 902 migrates the real volume 223 having the global volume ID "GVOL0003" to the storage apparatus 200 having the storage apparatus ID "ST1", migrates the real volume 223 having the global volume ID "GVOL0004" to the storage apparatus 200 having the storage apparatus ID "ST2", and turns off the main power supply 209 of the storage apparatus 200 having the storage apparatus ID "ST3".

(2-3-2) 6 Hours Later

By referring to the volume operation schedule management information shown in FIG. 39, the power supply control command program 902 confirms that the requested data transfer speed of the real volume 223 having the global volume ID "GVOL0004" changes from 44 (MB/sec) to 20 (MB/sec). Thus, by executing the foregoing access distribution processing, volume aggregation processing and power supply control command processing, the power supply control command program 902 sends to the storage controller 800 a command to migrate the real volume 223 having the global volume ID "GVOL0004" to the storage apparatus 200 having the storage apparatus ID "ST1" (step S60), sends a command to the storage apparatus 200 having the storage apparatus ID "ST3" to turn off the main power supply 209 of the storage apparatus having the storage apparatus ID "ST3" (step S68), thereby turns off the main power supply 209 of the storage apparatus 200 having the storage apparatus ID "ST3", and turns on the standby power supply 210.

FIG. 42 shows the access load status (6 hours later to 10 hours later) of the respective network I/Fs 203 after the completion of the power supply control command processing. The power supply control command program 902 refers to the volume operation schedule management information shown in FIG. 39, sends a command for migrating the real volume 223 having the global volume ID "GVOL0004" to the storage apparatus 200 having the storage apparatus ID "ST1", and turns off the main power supply 209 of the storage apparatus 200 having the storage apparatus ID "ST3".

(2-3-3) 10 Hours Later

By referring to the volume operation schedule management information shown in FIG. 39, the power supply control command program 902 confirms that the requested data transfer speed of the real volume 23 having the global volume ID "GVOL0003" changed from 12 (MB/sec) to 38 (MB/sec). Thus, since the access load of the network I/F ID 203 having the network I/F ID "Port0" in the storage apparatus 200 having the storage apparatus ID "ST1" will exceed the threshold value, the power supply control command program 902 executes the foregoing access distribution processing, volume aggregation processing and power supply control command processing so as to send a command to the storage apparatus 200 having the storage apparatus ID "ST2" to turn on the main power supply 209 of the storage apparatus 200 having the storage apparatus ID "ST2", thereby turns off the standby power supply 210 of the storage apparatus 200 having the storage apparatus ID "ST2", turns on the main power supply 209, and sends to the storage controller 800 a command to migrate the real volume 223 having the global volume ID "GVOL0003" to the storage apparatus 200 having the storage apparatus ID "ST2" (step S60).

FIG. 43 shows the access load status (10 hours later to 14 hours later) of the respective network I/Fs 203 after the completion of the power supply control command processing.

Figure 44:
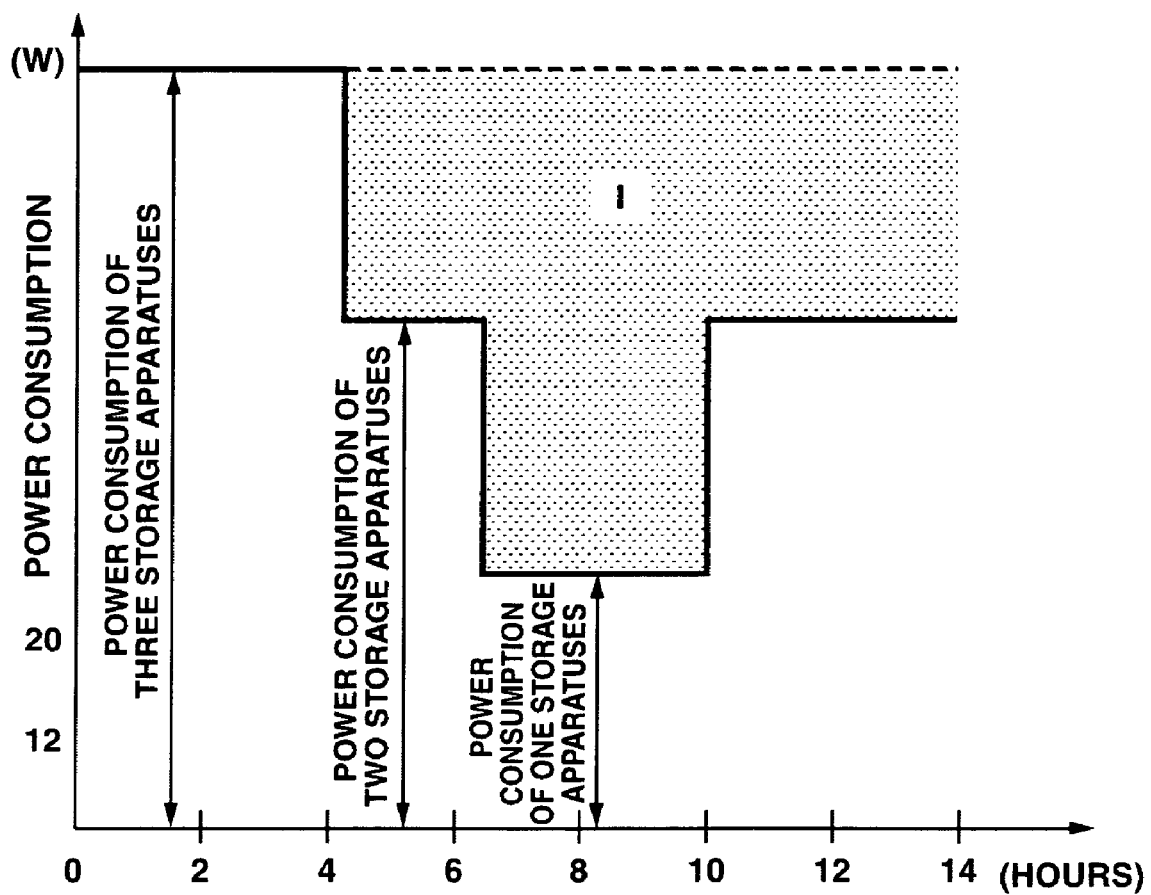
FIG. 44 is a conceptual diagram explaining the power consumption of a storage apparatus according to another embodiment of the present invention.

FIG. 44 shows an example of the power consumption of all storage apparatuses 200 in the second embodiment. Upon applying the power supply control command program 902 in the second embodiment, it is possible to reduce the power consumption in the area of section "I" shown in FIG. 44.

Accordingly, with the computer system 2, the storage apparatus 200 controls the power supply of the respective components, the main power supply 209 and the standby power supply 210 in the storage apparatus 200, and monitors the access load (MB/sec) of the storage extent in the storage apparatus 200. In addition, the management computer 500 acquires the monitoring result of the access load of the storage apparatus 200, calculates the periodical load tendency to the storage extent based on the acquired monitored result, migrates the storage extent to another storage apparatus 200 based on the calculated result, and commands the prescribed power supply operation to the corresponding storage apparatus 200.

Accordingly, in the management computer 900, the real volume 223 subject to an access load is migrated to another storage apparatus 200 based on the access load (MB/sec) of the real volume 223 in the storage apparatus 200, and it is thereby possible to perform access load processing and aggregation of the volume 223. In the storage apparatus 200, the main power supply 209 of the storage apparatus 200 that is no longer accessed can be turned off.

Incidentally, in the embodiment, although a case was explained where the volume migration computer 700 and the management computer 500, and the storage controller 800 and the management computer 900 were separate apparatuses, the present invention is not limited thereto, and may be the same apparatus.

Further, in the present embodiment, although a case was explained where the array group 222 and the volume 223 were configured from the disks 212 of the disk device 205, the present invention is not limited thereto, and these components may also be configured from a storage device having a real storage extent such as a hard disk drive, a flexible disk drive, a magnetic tape drive, a semiconductor memory drive, an optical disk drive or the like.

The present invention can be broadly applied to computer systems that perform power supply control of a plurality of storage apparatuses.

We claim:

1. A management computer for managing a plurality of storage apparatuses having a volume storing data sent from a host computer; comprising:
 a schedule information acquisition unit for acquiring schedule information as a schedule of a time frame in which said host computer accesses said volume of said plurality of storage apparatuses; and
 a power supply control command unit for sending to a corresponding storage apparatus a power supply control command for turning off a main power supply of said storage apparatus of a time frame in which said volume is not accessed based on a referral result of said schedule information acquired with said schedule acquisition unit.

2. The management computer according to claim 1, flirt her comprising:
 a threshold value acquisition unit for acquiring, for each network interface of said storage apparatus connected to said volume and for storing data received from said host computer in said volume, a threshold value of an available data transfer speed as a data transfer speed available to said network interface;
 a requested data transfer speed calculation unit for calculating said requested data transfer speed per said network interface based on a referral result of said schedule information acquired with said schedule acquisition unit; and
 a volume control command unit for migrating said volume based on said requested data transfer speed calculated with said requested data transfer speed calculation unit;
 wherein said schedule information acquisition unit acquires a requested data transfer speed as a data transfer speed requested by said host computer upon each access per said time frame; and
 wherein said power supply control command unit sends to a corresponding storage apparatus a power supply control command for turning off said main power supply of said storage apparatus that is no longer accessed due to the migration of said volume.

3. The management computer according to claim 2, wherein said volume control command unit sends to a corresponding storage apparatus a volume migration command for migrating said volume connected to a target network interface to another storage apparatus when said requested data transfer speed calculated with said requested data transfer speed calculation unit exceeds said threshold value acquired with said threshold value acquisition unit.

4. The management computer according to claim 3, wherein said volume control command unit sends to a corresponding storage apparatus a volume migration command for preferentially migrating said volume connected to a target network interface to another storage apparatus with low energy consumption.

5. The management computer according to claim 2, wherein said volume control command unit sends to a corresponding storage apparatus a volume connection command for connecting said volume connected to a target network interface to another network interface in a target storage apparatus when said requested data transfer speed calculated with said requested data transfer speed calculation unit exceeds said threshold value acquired with said threshold value acquisition unit.

6. The management computer according to claim 2, wherein said volume control command unit sends to a corresponding storage apparatus a volume connection command for connecting said volume connected to another network interface to a target network interface when said requested data transfer speed calculated with said requested data transfer speed calculation unit falls below said threshold value acquired with said threshold value acquisition unit.

7. The management computer according to claim 6, wherein said volume control command unit sends to a corresponding storage apparatus a volume migration command for preferentially migrating said volume of another storage apparatus with high energy consumption to said storage apparatus of a target network interface.

8. The management computer according to claim 2, wherein said volume control command unit sends to a corresponding storage apparatus a volume migration command for preferentially migrating said volume that has a smaller amount of data to be migrated.

9. The management computer according to claim 8, wherein said volume control command unit sends to a corresponding storage apparatus a volume migration command for migrating said volume by migrating difference data between said volume of a migration source and said volume of a migration target.

10. A power supply control method of a management computer for managing a plurality of storage apparatuses having a volume storing data sent from a host computer; comprising:
   a first step of acquiring schedule information as a schedule of a time frame in which said host computer accesses said volume of said plurality of storage apparatuses; and
   a second step of sending to a corresponding storage apparatus a power supply control command for turning off a main power supply of said storage apparatus of a time frame in which said volume is not accessed based on a referral result of said schedule information acquired at said acquisition step.

11. The power supply control method according to claim 10,
   wherein at said first step, a requested data transfer speed as a data transfer speed requested by said host computer upon each access is acquired per said time frame, and a threshold value of an available data transfer speed as a data transfer speed available to said network interface is acquired for each network interface of said storage apparatus connected to said volume and for storing data received from said host computer in said volume; and
   wherein at said second step, said requested data transfer speed per said network interface is calculated based on a referral result of said schedule information acquired at said first step, said volume is migrated based on said requested data transfer speed, and a power supply control command is sent to a corresponding storage apparatus for turning off said main power supply of said storage apparatus that is no longer accessed due to the migration of said volume.

12. The power supply control method according to claim 11, wherein at said second step, a volume migration command is sent to a corresponding storage apparatus for migrating said volume connected to a target network interface to another storage apparatus when the calculated requested data transfer speed exceeds said threshold value acquired at said first step.

13. The power supply control method according to claim 12, wherein at said second step, a volume migration command is sent to a corresponding storage apparatus for preferentially migrating said volume connected to a target network interface to another storage apparatus with low energy consumption.

14. The power supply control method according to claim 11, wherein at said second step, a volume connection command is sent to a corresponding storage apparatus for connecting said volume connected to a target network interface to another network interface in a target storage apparatus when the calculated requested data transfer speed exceeds said threshold value acquired at said first step.

15. The power supply control method according to claim 11, wherein at said second step, a volume connection command is sent to a corresponding storage apparatus for connecting said volume connected to another network interface to a target network interface when the calculated requested data transfer speed falls below said threshold value acquired at said first step.

16. The power supply control method according to claim 15, wherein at said second step, a volume migration command is sent to a corresponding storage apparatus for preferentially migrating said volume of another storage apparatus with high energy consumption to said storage apparatus of a target network interface.

17. The power supply control method according to claim 11, wherein at said second step, a volume migration command is sent to a corresponding storage apparatus for preferentially migrating said volume that has a smaller amount of data to be migrated.

18. The power supply control method according to claim 17, wherein at said second step, a volume migration command is sent to a corresponding storage apparatus for migrating said volume by migrating difference data between said volume of a migration source and said volume of a migration target.

19. A computer system including a plurality of storage apparatuses having a volume storing data sent from a host computer, and a management computer for managing said plurality of storage apparatuses,
   wherein said management computer comprises:
      a schedule information acquisition unit for acquiring schedule information as a schedule of a time frame in which said host computer accesses said volume of said plurality of storage apparatuses; and
      a power supply control command unit for sending to a corresponding storage apparatus a power supply control command for turning off a main power supply of said storage apparatus of a time frame in which said volume is not accessed based on a referral result of said schedule information acquired with said schedule acquisition unit; and
   wherein said plurality of storage apparatuses comprise a power supply control unit for turning off said main power supply based on said power supply control command sent from said power supply control command unit.

* * * * *

UNITED STATES PATENT AND TRADEMARK OFFICE
CERTIFICATE OF CORRECTION

PATENT NO.         : 7,653,784 B2                          Page 1 of 1
APPLICATION NO. : 11/638902
DATED                  : January 26, 2010
INVENTOR(S)        : Hirotaka Nakagawa et al.

It is certified that error appears in the above-identified patent and that said Letters Patent is hereby corrected as shown below:

Title page; should read;

(75)   Inventors:   Hirotaka Nakagawa, Fujisawa~~Tokyo~~ (JP);

Masayasu Asano, Yokohama~~Tokyo~~ (JP);

Yuichi Taguchi, Sagamihara~~Tokyo~~ (JP);

Masayuki Yamamoto, Sagamihara~~Tokyo~~ (JP).

Signed and Sealed this

Twenty-third Day of November, 2010

David J. Kappos
*Director of the United States Patent and Trademark Office*